(12) United States Patent
Fujimoto et al.

(10) Patent No.: US 10,337,611 B2
(45) Date of Patent: Jul. 2, 2019

(54) VARIABLE-SPEED DRIVE DEVICE FOR POWER UNIT

(71) Applicant: HONDA MOTOR CO., LTD., Minato-ku, Tokyo (JP)

(72) Inventors: Yasushi Fujimoto, Wako (JP); Hiroyuki Makita, Wako (JP); Masashi Koyanagi, Wako (JP); Yoshinobu Shiomi, Wako (JP); Jun Adachi, Wako (JP); Junya Ono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 388 days.

(21) Appl. No.: 15/500,818

(22) PCT Filed: Jul. 24, 2015

(86) PCT No.: PCT/JP2015/071085
§ 371 (c)(1),
(2) Date: Jan. 31, 2017

(87) PCT Pub. No.: WO2016/021423
PCT Pub. Date: Feb. 11, 2016

(65) Prior Publication Data
US 2017/0227125 A1 Aug. 10, 2017

(30) Foreign Application Priority Data

Aug. 4, 2014 (JP) .................................. 2014-158800

(51) Int. Cl.
*F16H 57/00* (2012.01)
*F16H 59/04* (2006.01)
(Continued)

(52) U.S. Cl.
CPC ......... *F16H 63/18* (2013.01); *F16H 57/0006* (2013.01); *F16H 63/30* (2013.01); *F16H 59/04* (2013.01)

(58) Field of Classification Search
CPC ...... F16H 63/18; F16H 63/30; F16H 57/0006; F16H 59/04
(Continued)

(56) References Cited

U.S. PATENT DOCUMENTS 5,018,404 A * 5/1991 Muller .................... F16H 63/20
74/339
5,363,712 A * 11/1994 Muller ................. F16H 3/0915
74/337.5
(Continued)

FOREIGN PATENT DOCUMENTS

JP   S61-262824 A   11/1986
JP   2008-082520 A   4/2008
(Continued)

*Primary Examiner* — Ha Dinh Ho
(74) *Attorney, Agent, or Firm* — Carrier Blackman & Associates, P.C.; Joseph P. Carrier; William D. Blackman

(57) ABSTRACT

A variable-speed drive device for a power unit to be used in a vehicle equipped with a stopper pin passed through an opening in a master arm for regulating the amount of rotary movement of the master arm. Shock-absorbing device is provided on the master arm or the stopper pin At least a part of the shock-absorbing device is formed to project into the path along which the stopper pin moves relative to the opening of the master arm, from a stopper pin outer surface or from edge portions of a defining edge of the opening in the master arm onto extension of the stopper pin path. As a result, even if the master arm and the stopper pin contact one another at high speed, it is possible to suppress the sound of contact and suppress an increase in the weight of a stopper pin fixing part.

8 Claims, 16 Drawing Sheets

(51) Int. Cl.
*F16H 63/18* (2006.01)
*F16H 63/30* (2006.01)

(58) Field of Classification Search
USPC ......... 74/335, 473.1, 473.21, 473.26, 473.35
See application file for complete search history.

(56) References Cited

U.S. PATENT DOCUMENTS

| | | | | |
|---|---|---|---|---|
| 5,395,293 | A | * | 3/1995 | Matsuura ............... B60W 10/08 477/15 |
| 5,542,309 | A | * | 8/1996 | Wenger ................... F16H 61/32 74/337.5 |
| 5,966,989 | A | * | 10/1999 | Reed, Jr. ................ F16H 63/18 74/331 |
| 6,095,004 | A | * | 8/2000 | Ota ......................... F16H 61/32 74/336 R |
| 8,051,733 | B2 | | 11/2011 | Mizuno et al. |

FOREIGN PATENT DOCUMENTS

| | | |
|---|---|---|
| JP | 2008-089059 A | 4/2008 |
| JP | 2009-047238 A | 3/2009 |
| JP | 2014-073817 A | 4/2014 |

\* cited by examiner

VARIABLE-SPEED DRIVE DEVICE FOR POWER UNIT

TECHNICAL FIELD

The present invention relates to a variable-speed drive device for a power unit used, for example, in a vehicle such as a motorcycle.

BACKGROUND ART

Patent Document 1 (prior document) discloses a device for changing the gear ratio of a transmission for a vehicle power unit by means of a control unit for operating an electric motor as a shift motor (hereinafter referred to as a variable-speed drive device).

The variable-speed drive device disclosed in the prior document is provided with an electric motor, a reduction gear mechanism for reducing the rotational speed of the electric motor, a shift spindle driven in rotation by the reduction gear mechanism, a shift arm (master arm) provided on the shift spindle, and a shift drum rotated intermittently by the shift arm. The shift arm is formed with a guide hole (opening), and a guide pin (stopper pin) extends through the guide hole. The rotational angles of the shift arm in two rotational directions are regulated or determined by abutment of the outer surface of the guide pin with the defining edge of the guide hole.

PRIOR ART DOCUMENT

Patent Document

[Patent Document 1] JP 2008-082520 A

DISCLOSURE OF THE INVENTION

Problem to be Solved by the Invention

In the variable-speed drive device disclosed in the prior document, the speed change operation of the transmission is electrically performed by the shift motor. It is desirable that the speed change operation be performed in a short time to quicken the reaction to the shifting operation made by the operator. In order for the speed change operation to be performed in a short time, it is required that the shift motor be operated at increased rotational speed, to thus rotate the shift spindle at increased speed. However, if the shift spindle is rotated at increased speed, the shift arm or master arm is also driven in rotation at increased speed, so that the defining edge of the opening of the master arm is caused to hit the outer surface of the stopper pin at high speed.

When the defining edge of the opening of the master arm hits the outer surface of the stopper pin at high speed, an increased hitting sound will possibly be produced. Further, shocks produced by the high speed hitting will be transmitted to the boss part fixing the stopper pin, so that the boss part fixing the stopper pin and its adjoining parts will have to be given an increased strength so that the thickness and the weight thereof will increase.

The present invention has been made to solve the above problem, and the object of the invention is provide a variable-speed drive device for a power unit, which can suppress the striking sounds, increase the strength of the boss part fixing the stopper pin and its adjoining parts, and to suppress increase in weight of the boss part fixing the stopper pin and its adjoining parts, even in case the master arm makes rotary movement at high speed such that the defining edge of the opening of the master arm hits the outer surface of the stopper pin at relatively high speed.

Means for Solving the Problem

To solve the above underlying problem, the present invention provides a variable-speed drive device for a power unit, used for a transmission wherein speed changes are performed by intermittent rotation of a shift drum, comprising: a shift spindle for operating the transmission for speed changes; a master arm fixedly mounted on the shift spindle for rotary movement with the shift spindle and having an opening; and a stopper pin extending through the opening of the master arm to regulate the amount of the rotary movement of the master arm; wherein:

at least one of the master arm and the stopper pin is provided thereon with a shock absorbing device; and at least a part of the shock absorbing device protrudes into a path of rotary movement of the stopper pin in the opening of the master arm, from at least one of an outer surface of the stopper pin and each of edge portions included in a defining edge of the opening of the master arm, when viewed in the axial direction of the stopper pin, the edge portions lying on extensions of the path of the rotary movement of the stopper pin.

According to the above feature of the invention, when the rotary movement of the master arm is regulated by the stopper pin, the stopper pin and the shock absorbing device are first bought into abutment with each other, and thereupon the shock absorbing device is deformed to suppress the shocks that occur when the stopper pin regulates the rotary movement of the master arm. Since the shocks are suppressed, it is easy to secure the strength of the boss part fixing the stopper pin including its adjoining parts and to thereby prevent increase in thickness of the boss part fixing the stopper pin including its adjoining parts of a casing to enable reduction in their weight and to suppress the striking sounds produced between the master arm and the stopper pin.

In a preferred embodiment of the invention, the master arm is so formed in a plate shape that abutment of the edge portions of the opening of the master arm with the outer surface of the stopper pin regulates the rotary movement; and the shock absorbing device is provided on one of the surfaces of the master arm with respect to the axial direction of the stopper pin.

According to this feature, when the rotary movement of the master arm is regulated by the stopper pin, the shock-absorbing device first contacts the stopper pin and is deformed, and thereafter the edge portion of the opening of the master arm contacts the stopper pin, whereby shocks produced due to the contact of the master arm with the stopper pin is absorbed. Further, it is easy to secure the strength of the stopper pin fixing portion and to prevent thickness increase of the stopper pin fixing portion including the fixing boss and its adjoining case portion with resultant weight reduction of them and contact noise reduction. The deformation of the shock absorbing device ceases when the master arm contacts the stopper pin directly, the amount of deformation of the shock absorbing device by the stopper pin during the shock absorbing operation can be controlled a predetermined amount, whereby the durability of the shock absorbing device is secured.

The shock absorbing device may comprise a damper body of an elastic material, and a fixing pin fixedly attaching the damper body to the master arm.

According to this feature, the shock absorbing device has a simple construction consisting of only the damper body and the fixing pin, and can be installed at a required local position only, whereby the provision of the shock absorbing device on the master arm does not cause weight increase of the master arm and increase in the installation cost.

The shock absorbing device may be provided at each of two locations on opposite sides of the stopper pin and at each of locations in the edge portions of the opening of the master arm.

According to this feature, the shock absorbing devices are provided at positions required in the down-shifting and up-shifting directions of the transmission, weight increase of the master arm due to the provision of the shock absorbing devices on the master arm and the installation cost increase can be suppressed.

The shift spindle may be associated with a return spring for urging the master arm to return to a position prior to the rotary movement; and the return spring may be provided on a surface of the master arm opposite the one surface of the master arm on which the shock absorbing device is provided, with respect to the axial direction of the stopper pin.

According to this feature, the shock absorbing device and the return spring can be arranged in a compact disposition on the master arm, with the functions of these members maintained.

In a preferred from of the invention, the shock absorbing device is provided on the outer surface of the stopper pin; the shock absorbing device includes an elastic member disposed on the outer surface of the stopper pin; and the rotary movement of the master arm is regulated by the stopper pin through the shock absorbing device.

According to this feature, when the rotary movement of the master arm is regulated by the stopper pin, the elastic member provided on the outer surface of the stopper pin is deformed to thereby reduce the shocks produced when the stopper pin regulates the rotary movement of the master arm. Further, it is easy to secure the strength of the stopper pin fixing portion, whereby increase in thickness of the stopper pin fixing portion including the fixing boss and case portions is suppressed with resultant reduction in their weight and with resultant suppression of the striking sounds produced between the master arm and the stopper pin. Furthermore, the elastic member can be provided on the stopper pin in a simple way.

Preferably, the shock absorbing device includes a cylindrical collar fitted on the stopper pin; the elastic member is disposed between an inner surface of the cylindrical collar and the outer surface of the stopper pin; and a protrusion is formed on one of the inner surface of the cylindrical collar and the opposite outer surface of the stopper pin.

According to this feature, when the rotational movement of the master arm is regulated by the stopper pin, the master arm first contacts the outer surface of the collar, then the elastic member is deformed, and thereafter the collar contacts the stopper pin through the protrusion thereof, whereby shocks on the stopper pin during the contact is dampened. This means that the strength of the stopper pin fixing portion can be secured, the thickness of the stopper pin fixing boss and its neighboring case portion need not be increased so that their weight can be reduced. Additionally the contact noise between the master arm and the stopper pin can be reduced. Further, since the contact of the collar with the protrusion of the stopper pin terminates the deformation of the elastic element, the amount of deformation of the elastic element can be controlled a predetermined amount, and the durability of the elastic element can be retained.

Preferably, the protrusion is formed in a position coinciding with the defining edge of the opening of the master arm, with respect to the axial direction of the stopper pin; and the elastic member and a further elastic member are arranged in a pair on opposite sides of the protrusion with respect to the axial direction of the stopper pin.

According to this feature, when the rotary movement of the master arm is regulated by the stopper pin, the collar contacts the master arm and then is displaced in the direction of the rotary movement of the master arm while concurrently deforming the pair of the elastic members, whereby a smooth operation of the shock absorbing device can be obtained.

In a preferred form of the invention, the stopper pin includes a rod section and a reduced diameter section smaller in diameter than the rod section; a guide shoulder is formed between the rod section and the reduced diameter section to guide radial movement of the collar; the shock absorbing device is fitted on the reduced diameter section; and the reduced diameter section is fitted therearound with a guide washer and a retaining ring at axially opposite side of the guide shoulder with respect to the shock absorbing device, the guide washer functioning to guide radial movement of the collar and the retaining ring functioning to prevent axial displacement of the guide washer and the collar.

According to this feature, when the rotary movement of the master arm is regulated by the stopper pin, the collar is displaced in the direction of the rotary movement of the master arm under the guidance of both the guide shoulder and the guide washer while maintaining the attitude parallel to the stopper pin, so that a smooth operation of the shock absorbing device is obtained.

Effect of the Invention

According to the variable-speed drive device for a power unit in accordance with the present invention, when the rotary movement of the master arm is regulated by the stopper pin, deformation of the shock absorbing device occurs as soon as the stopper pin and the shock absorbing device are first bought into abutment with each other. The deformation of the shock absorbing device serves to suppress the shocks that occur when the stopper pin regulates the rotary movement of the master arm, to secure the strength of the boss part fixing the stopper pin including its adjoining parts, to prevent the thickness of the boss part fixing the stopper pin including its adjoining parts from increasing to thereby enabling reduction in weight, and to suppress the striking sounds between the master arm and the stopper pin.

BEST MODE FOR CARRYING OUT THE INVENTION

A first embodiment of a variable-speed drive device 20 of a power unit P according to the present invention will be described with reference to FIGS. 1 through 10.

Figure 1:
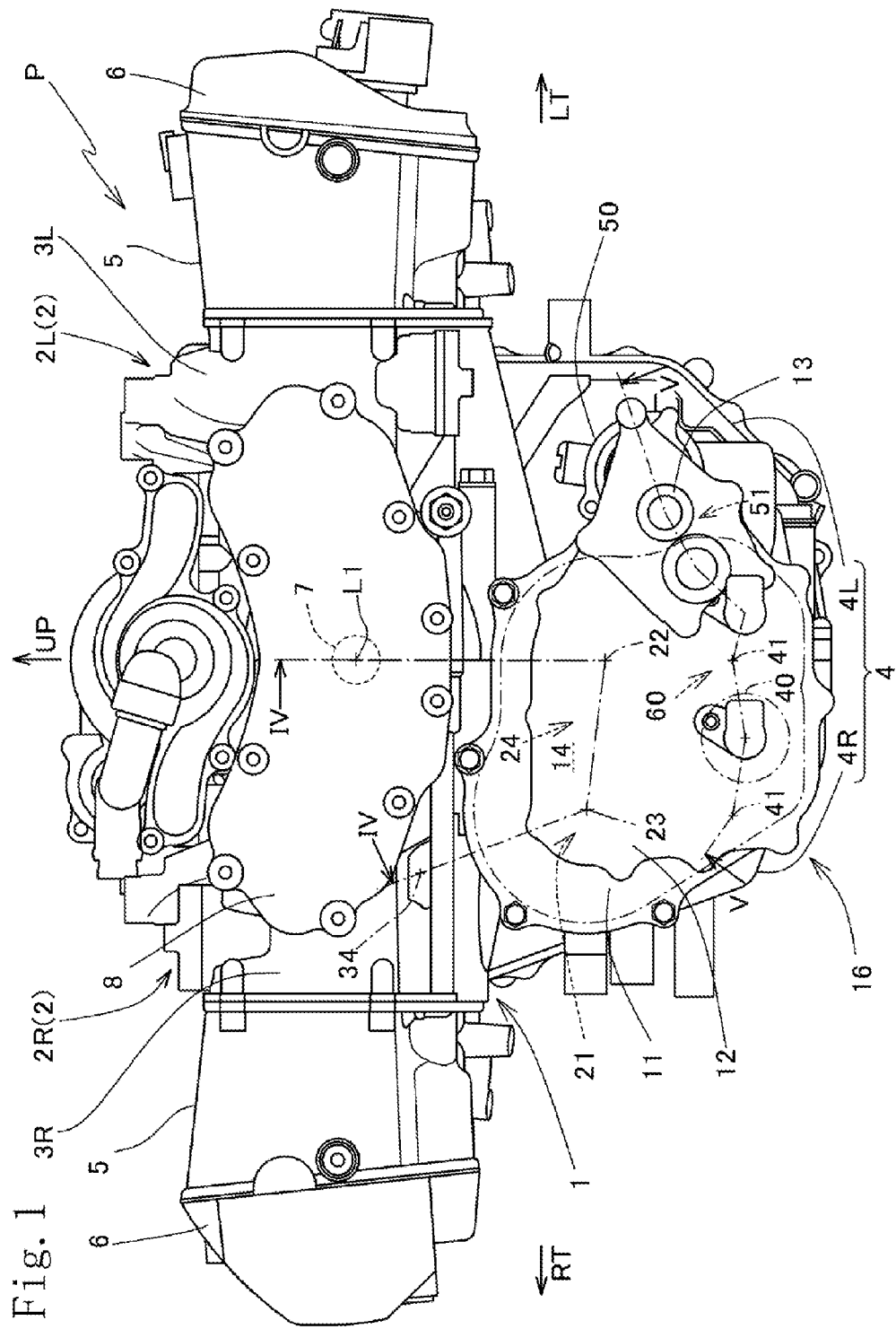
FIG. 1 is a front view of a variable-speed drive device for a power unit according to a first embodiment of the invention.
Figure 2:
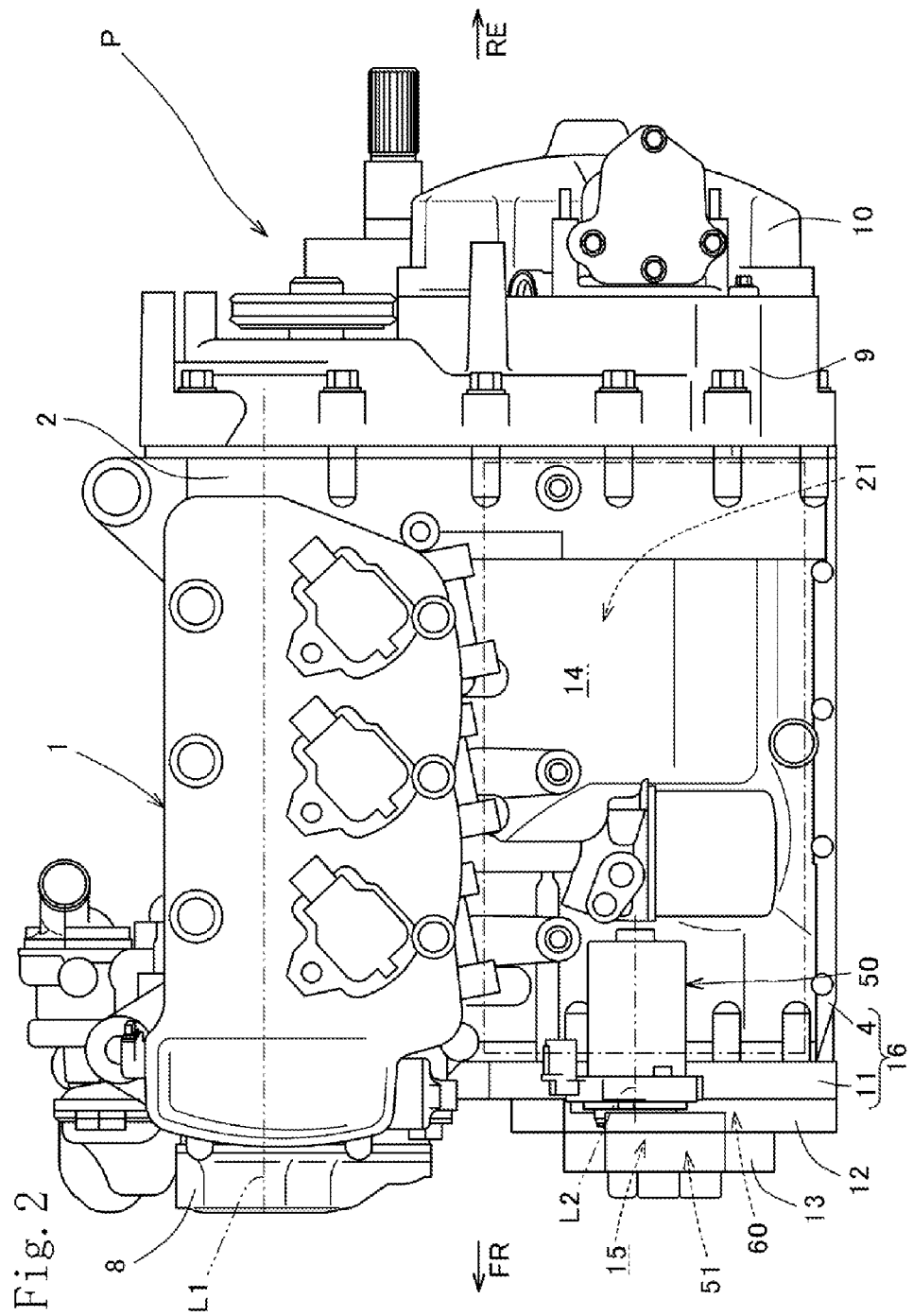
FIG. 2 is a left side view of the power unit shown in FIG. 1 with parts thereof omitted.

FIG. 1 shows a front view of the power unit P, with apart thereof removed, according to the first embodiment, and FIG. 2 is a side view of the power unit P, with a part thereof removed, as seen from the left side of FIG. 1.

The power unit P is mounted on a two-wheel motorcycle and is made up of a water-cooled, four-stroke internal combustion engine 1 with horizontally-oppositely arranged six-cylinders and with a crankshaft 7 thereof oriented in the longitudinal or front-to-rear direction of the motorcycle, and a transmission 21 connected to the engine 1 to shift gears to change the output power of the engine 1 in various speeds.

In the following description and the claims, "front", "rear", "left", and "right" are used to mean the directions with respect the motorcycle on which the engine is mounted, and FR, RE, LT, RT, UP and DW in the drawings mean "front", "rear", "left", "right", "upward" and "downward", respectively.

As shown in FIG. 1, the internal combustion engine 1 is provided with an engine block 2 including a left engine block half-section 2L positioned on the left side of the engine on the motorcycle as directed to the running direction thereof, and a right engine block half-section 2R positioned on the right side of the engine on the motorcycle, cylinder heads 5 fixed respectively to the left and right sides of the engine block half-sections 2L and 2R, and cylinder head covers 6 fixed respectively to the cylinder heads 5.

The left engine block half-section 2L is made up of a left cylinder block 3L and a left crankcase half-section 4L formed integral with the left cylinder block 3L. The right engine block half-section 2R is made up of a right cylinder block 3R and a right crankcase half-section 4R formed integral with the right cylinder block 3R. The left crankcase half-section 4L and the right crankcase half-section 4R constitute a crankcase 4.

Referring also to FIG. 2, the crankshaft 7 has its rotational axis L1 oriented in the front-to-rear direction of the motorcycle and is supported rotatably between the left and right engine block half-sections 2L and 2R, which constitute an upper part of the engine block 2.

Pistons (not shown) in the engine block 2 are connected to the crankshaft 7 through connecting rods (not shown), respectively, so that the crankshaft 7 is driven in rotation in connection with sliding movement of each of the pistons due to combustion within a combustion chamber (not shown) with which each piston is associated.

As indicated in FIGS. 1 and 2, a front cover 8 is attached to and covers a front upper part of the engine block 2 in the area covering the axis of the crankshaft 7. In a lower part of the engine block 2 is provided a transmission chamber 14 containing transmission gears 21 to be described later, the transmission chamber 14 being defined by the left and right crankcase half-sections 4L and 4R. The transmission chamber 14 is shown by one-dot chain line in these figures.

As shown in FIG. 2, a rear cover 9 is attached to the rear of the engine block 2. A clutch cover 10 is attached to a rear lower portion of the rear cover 9.

In FIGS. 1 and 2, a transmission holder 11 is fixed to a front lower surface of the crankcase 4 to cover the front of the crankcase 4. To the front surface of the transmission holder 11 is fixed a gear change mechanism holder 12 for holding a gear change mechanism 60 therein, the gear change mechanism holder 12 extending from a middle height to the lower edge of the transmission holder 11.

To the front left portion of the gear change mechanism holder 12 is attached a reduction gear mechanism cover 13 to define a reduction gear mechanism chamber 15 between the gear change mechanism holder 12 and the reduction gear mechanism cover 13. A reduction gear mechanism 51 to be described later is provided within the reduction gear mechanism chamber 15. The gear change mechanism holder 12 has, on its left rear surface, a shift motor 50 attached thereto, the shift motor 50 being a power source for the variable-speed drive device 20 of the invention.

Figure 3:
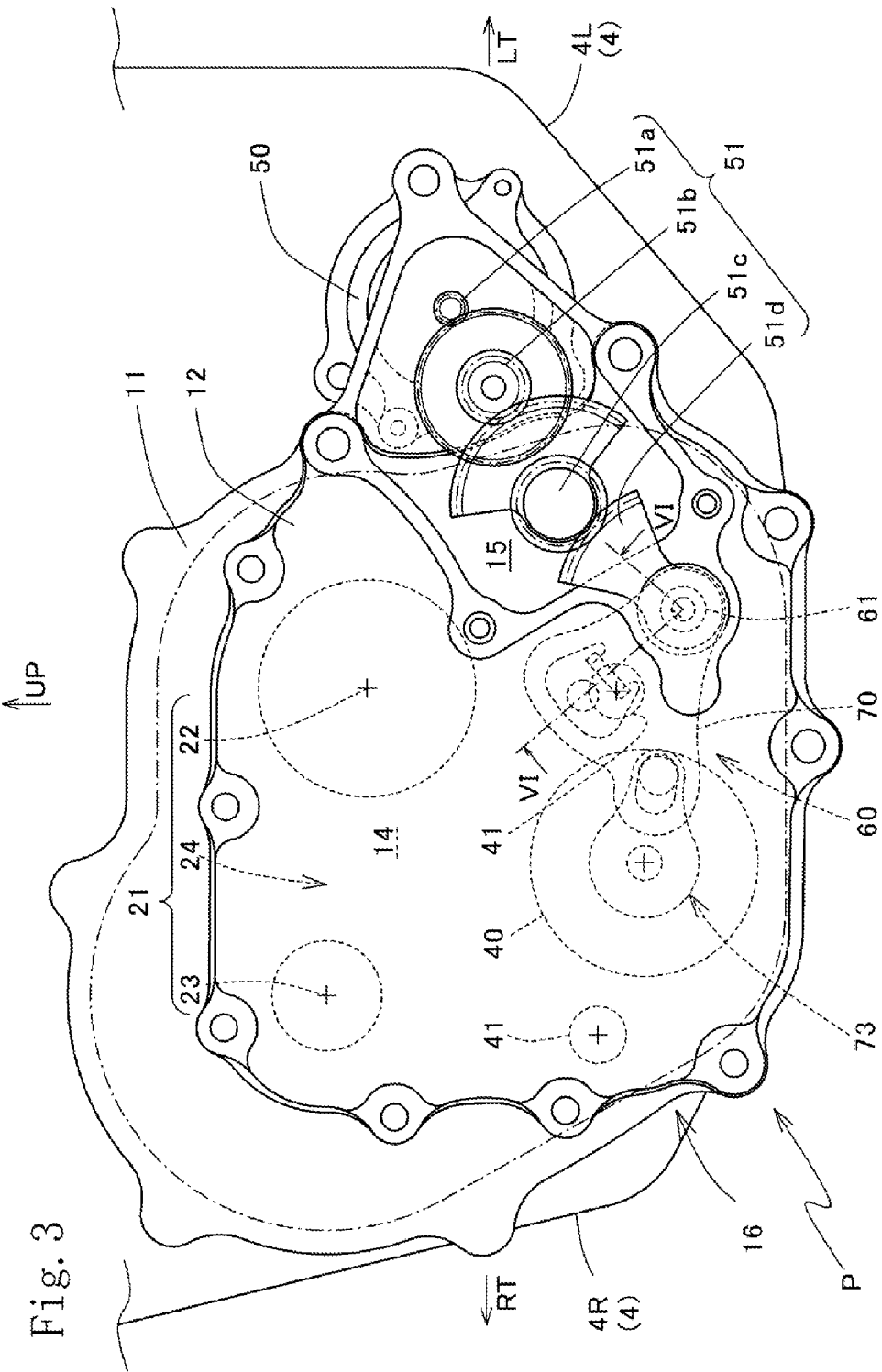
FIG. 3 is an enlarged front view showing a crankcase forming a lower part of the power unit, with a reduction gear mechanism cover removed.

FIG. 3 shows a fragmentary enlarged front view of the crankcase 4 in the lower part of the power unit P, with the reduction gear mechanism cover 13 removed.

As shown in FIG. 3, behind the transmission holder 11 are provided a main shaft 22, a counter shaft 23, a speed change gear mechanism 24, a shift drum 40 and two shift fork shafts 41, these members being assembled in the form of a preassembled cassette unit. The cassette unit is put into the transmission chamber 14 defined in the left and right crankcase half-sections 4L, and then the transmission holder 11 is securely attached to the front of the crankcase 4 to close the front side of the transmission chamber 14. Thus the crankcase 4 and the transmission holder 11 are given the roll of a transmission housing 16. By employing such a cassette unit, assembling operation of the main shaft 22, the counter shaft 23, the speed change gear mechanism 24, the shift drum 40 and the two shift fork shafts 41 into the crankcase 4, is facilitated. The cassette unit may be assembled into the crankcase 4 in the condition that the cassette unit has been assembled also with the reduction gear mechanism cover 13 and the shift motor 50.

The main shaft 22, the counter shaft 23, the shift drum 40 and the two shift fork shafts 41 are arranged to be parallel to the rotational axis L1 of the crankshaft 7. As shown in FIG. 1, the main shaft 22 is positioned below the crankshaft 7, and the counter shaft 23 is positioned on the right side of the main shaft 22. The shift drum 40 is positioned in the middle of the lower space of the transmission chamber 14. The two shift fork shafts 41 are disposed below the main shaft 22 and the counter shaft 23 and on the left and right sides of the shift drum 40.

Figure 4:
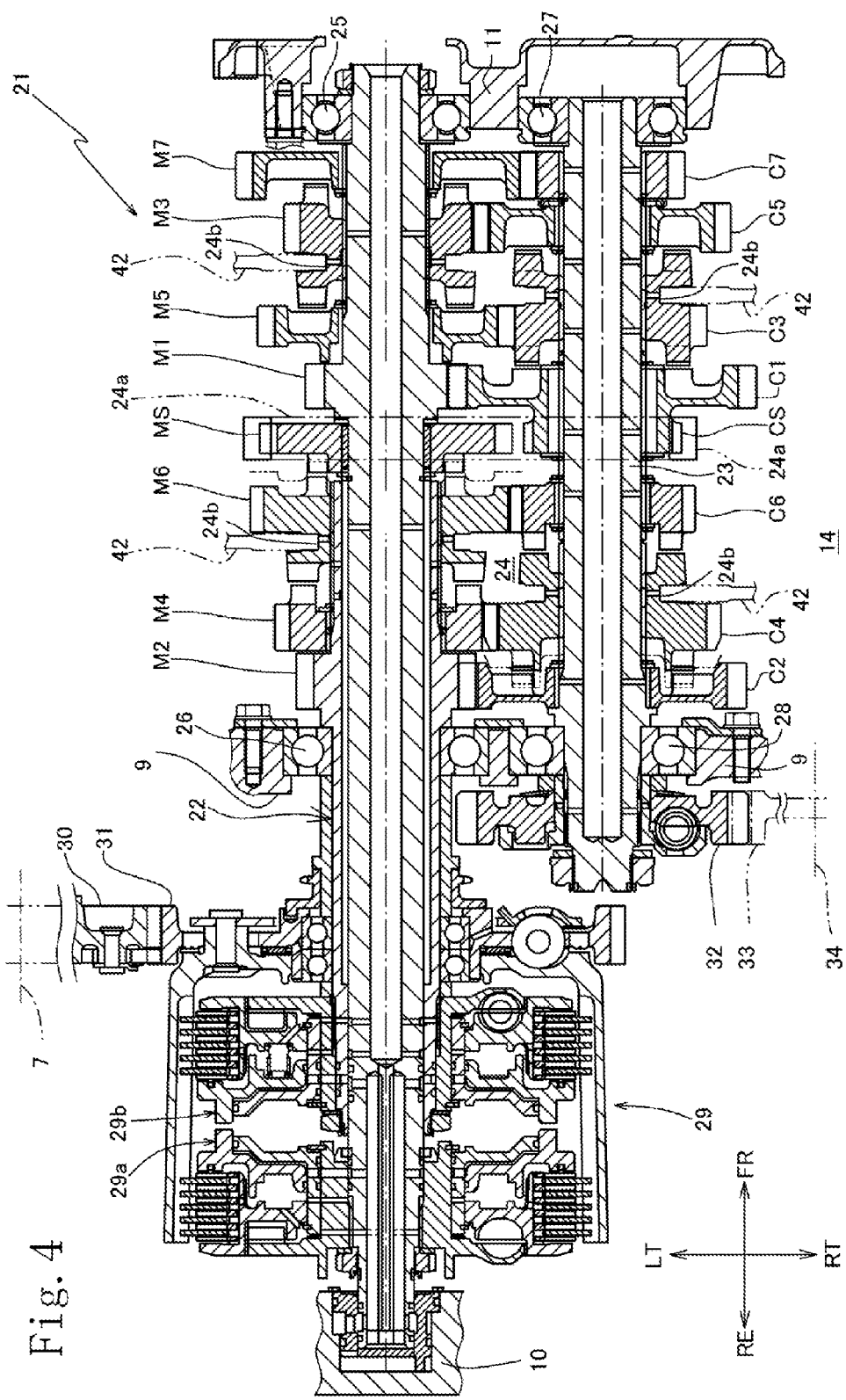
FIG. 4 is a sectional view of a transmission, taken along the line IV-IV in FIG. 1.

FIG. 4 shows the transmission 21 in the section taken on the line IV-IV of FIG. 1.

As indicated in FIG. 4, the transmission 21 includes the main shaft 22, the counter shaft 23, the speed change gear mechanism 24 and a clutch mechanism 29. The clutch mechanism 29 is in the form of a dual clutch (twin clutch) made up of a first hydraulic clutch 29a and a second hydraulic clutch 29b.

One end portion of the main shaft 22 is rotatably supported by the transmission holder 11 via a ball bearing 25, while the other end portion of the main shaft 22 passes through a ball bearing 26 fixed in the rear cover 9, and thus the middle portion of the main shaft 22 is supported rotatably by the rear cover 9 through the bearing 26.

One end portion of the counter shaft 23 is rotatably supported by the transmission holder 11 via a ball bearing 27, while the other end portion of the counter shaft 23 passes through a ball bearing 28 fixed in the rear cover 9, and thus the other end portion of the counter shaft 23 is supported rotatably by the rear cover 9 through the bearing 28.

On the main shaft 22 are provided seven speed change driving gears M including gears M1 to M7 which are arranged in this order from one end of the main shaft 22 to the intermediate portion of the shaft 22, while on the counter shaft 23 are provided seven speed change driven gears C including gears C1 to C7 which are paired with and constantly in mesh with the driving gears M. On the main and counter shafts 22 and 23 are provided mutually oppositely disposed sprockets MS and CS, respectively, for reverse rotation. An endless chain 24a is passed around the sprockets MS and CS. The speed change gear mechanism 24 is made up of the driving gears M, the driven gears C, and the sprockets MS and CS for reverse rotation.

The speed change driving gear M3, for a third speed, and the speed change driving gear M6, for a sixth speed, are shifter gears movable axially on the main shaft 22. These driving gears M3 and M6 are engageable selectively with one of the adjoining driving gears M2, M4, M5 and M7, or with the sprocket MS for reverse rotation.

The speed change driven gear C4, for a fourth speed, and the speed change driven gear C3, for a fifth speed, are shifter gears movable axially on the counter shaft 23. These driven gears C4 and C3 are engageable selectively with one of the adjoining driven gears C1, C2, C5 and C6.

Each of the above shifter gears is formed with a fork-engaging groove 24b. A shift fork 42 is operated to engage the fork-engaging groove 24b of each shifter gear to axially shift the same.

The other end portion of the main shaft 22 passing through the rear cover 9 is in spline engagement with the clutch mechanism 29 made up of the first hydraulic clutch 29a and the second hydraulic clutch 29b. A primary driven gear 31 is fixedly secured to the clutch mechanism 29. The other end of the main shaft 22 is rotatably supported by the clutch cover 10.

A secondary driving gear 32 is in spline engagement with the other end of the counter shaft 23 protruding through the rear cover 9.

The power of the crankshaft 7 is transmitted to the clutch mechanism 29 through a primary driving gear 30 and the primary driven gear 31. The power is transmitted from the crankshaft 7 to the main shaft 22 by selectively connecting the first hydraulic clutch 29a or the second hydraulic clutch 29b by means of a hydraulic circuit. The power transmitted from the crankshaft 7 to the main shaft 22 is transmitted to the secondary driving gear 32 in a speed change rate established selectively by the speed change gear mechanism 24. The power thus transmitted is taken out of the power unit P through the secondary driven gear 33 and a driving shaft 34.

Figure 5:
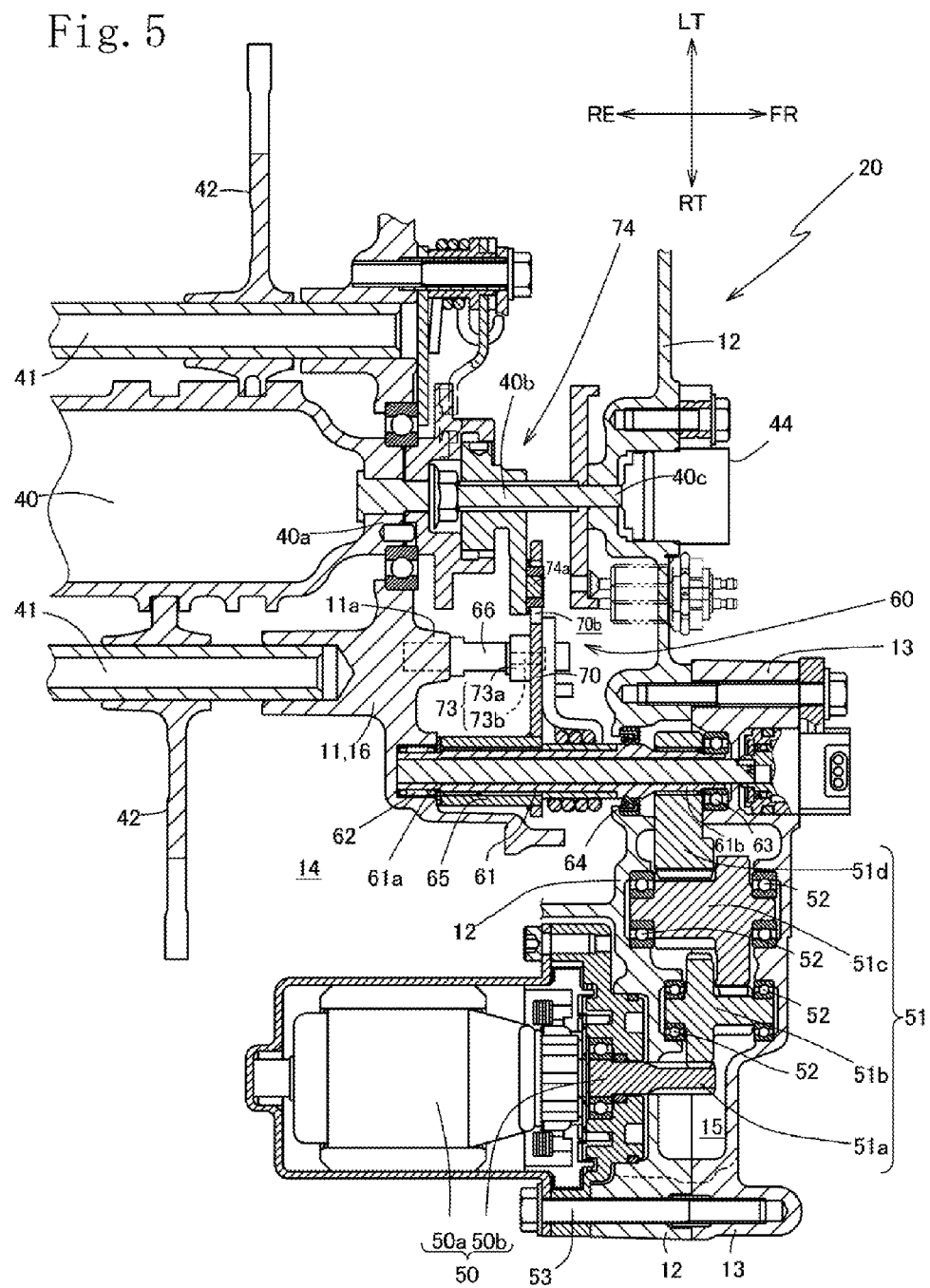
FIG. 5 is a sectional view, taken along the line V-V in FIG. 1.

FIG. 5 is a section taken on the line V-V of FIG. 1.

As shown in FIG. 5, the shift fork shafts 41 supporting the shift forks 42, respectively, and the shift drum 40 are supported by the transmission holder 11 and the rear cover 9 (not shown in the figure) so as to be located in the transmission chamber 14. A shift drum shaft 40b extends toward the front from a front end 40a of the shift drum 40. The shift drum shaft 40b has a front end 40c extending through the gear change mechanism holder 12 to the outside thereof and is connected to a shift position sensor 44 for detecting speed change position of the shift drum 40.

The rotary power of the shift motor 50 causes the shift drum 40 to rotate through a gear change mechanism 60 to be described later, so that each of the shift forks 42 are shifted along its associated shift fork shaft 41 to shift its associated shifter gear of the transmission 21. The speed change rate of the transmission 21 is thus selectively established.

Next, the variable-speed drive device 20 will be described below. The variable-speed drive device 20 operates to rotate the shift drum 40 to shift each shifter gear of the transmission 21 to have the transmission 21 perform the speed change operation.

The variable-speed drive device 20 is made up of the speed change mechanism 60 for selectively establishing speed change rate, the shift motor 50 for supplying rotary power to the speed change mechanism 60, and the reduction gear mechanism 51 for receiving rotary power from the shift motor 50 and outputting power of reduced speed to the speed change mechanism 60. Power required for speed change is transmitted from the shift motor 50 to a shift spindle 61 of the change mechanism 60 through the reduction gear mechanism 51 so as to rotate the shift spindle 61. The rotation of the shift spindle 61 causes swinging or rotary movement of a master arm 70 of the change mechanism 60, which rotary movement of the master arm 70 causes intermittent rotation of the shift drum 40 so that the shift forks 42 operate to shift the associated shifter gears of the transmission 21 to have the latter perform speed change operation.

As shown in FIGS. 1 to 3, the shift motor 50 has its rotational axis L2 oriented in parallel with the rotational axis L1 of the crankshaft 7 so as to extend in the front-to-rear direction of the motorcycle. The shift motor 50 is located to be mostly covered by the reduction gear mechanism cover 13, when seen from the front side, and to overlap in position with the transmission chamber 14, when seen from the lateral side. As shown in FIG. 5, the shift motor 50 is fixedly secured to the gear change mechanism holder 12 by means of bolts 53.

As indicated in FIG. 5, the shift motor 50 includes a motor main body 50a and a motor shaft 50b extending to the front from the main body 50a. The motor shaft 50b extends through the gear change mechanism holder 12 and has its free end positioned in the reduction gear mechanism chamber 15 defined by the gear change mechanism holder 12 and the reduction gear mechanism cover 13. A drive gear 51a of the reduction gear mechanism 51 is formed integrally in the free end of the motor shaft 50b.

The reduction gear mechanism 51 is contained in the reduction gear mechanism chamber 15 and made up of the drive gear 51a formed in the motor shaft 50b of the shift motor 50, a first gear 51b formed with gear teeth of larger and smaller diameters, a second gear 51c formed with gear teeth of larger and smaller diameters, and a driven gear 51d. These gears have their rotational axes extending parallel to the motor shaft 50b of the shift motor 50.

The first and second gears 51b and 51c are rotatably supported through bearings 52 by the gear change mechanism holder 12 and the reduction gear mechanism cover 13 defining the reduction gear mechanism chamber 15. Constant meshing engagement of the drive gear 51a with the first gear 51b, the first gear 51b with the second gear 51c, and the second gear 51c with the driven gear 51d makes it possible for the rotational power of the shift motor 50 to be transmitted to the driven gear 51d with speed reduction.

Next, the gear change mechanism 60 for intermittently rotating the shift drum 40 will be described.

As shown in FIG. 5, the gear change mechanism 60 is located in a front portion of the transmission chamber 14. The gear change mechanism 60 includes the shift spindle 61 connected to the reduction gear mechanism 51 to be rotated by the rotational power of the shift motor 50, the master arm 70 rotatable integrally with the shift spindle 61, a stopper pin 66 for limiting the amount of rotary movement of the master arm 70, and a pole ratchet mechanism 74 for intermittently rotating the shift drum 40 in connection with the rotary movement of the master arm 70. The gear change mechanism 60 operates to cause the shift spindle 61 to rotate by the rotary power transmitted from the shift motor 50 through the reduction gear mechanism 51, to cause the master arm 70 to make rotary movement by the rotation of the shift spindle 61, and to cause the shift drum 40 connected to the pole ratchet mechanism 74 to intermittently rotate by the operation of the pole ratchet mechanism 74.

FIG. 5 shows that the shift spindle 61 is located at the left side of the shift drum 40 and has its rotational axis parallel with the axis of the shift drum 40 so as to extend in the front-to-rear direction of the motorcycle.

The shift spindle 61 has it one end 61a rotatably supported through a needle bearing 62 by the transmission holder 11 forming the transmission housing 16. The shift spindle 61 has it other end 61b rotatably supported through a ball bearing 63 by the reduction gear mechanism cover 13. The shift spindle has its intermediate portion positioned toward the other end 61b rotatably supported through an oil seal 64 by the gear change mechanism holder 12.

On the other end 61b of the shift spindle 61 is fixedly fitted the driven gear 51d of the reduction gear mechanism 51. On the one end 61a of the shift spindle 61 is fitted the master arm 70 to be described in detail later through an elongated color 65.

Figure 6:
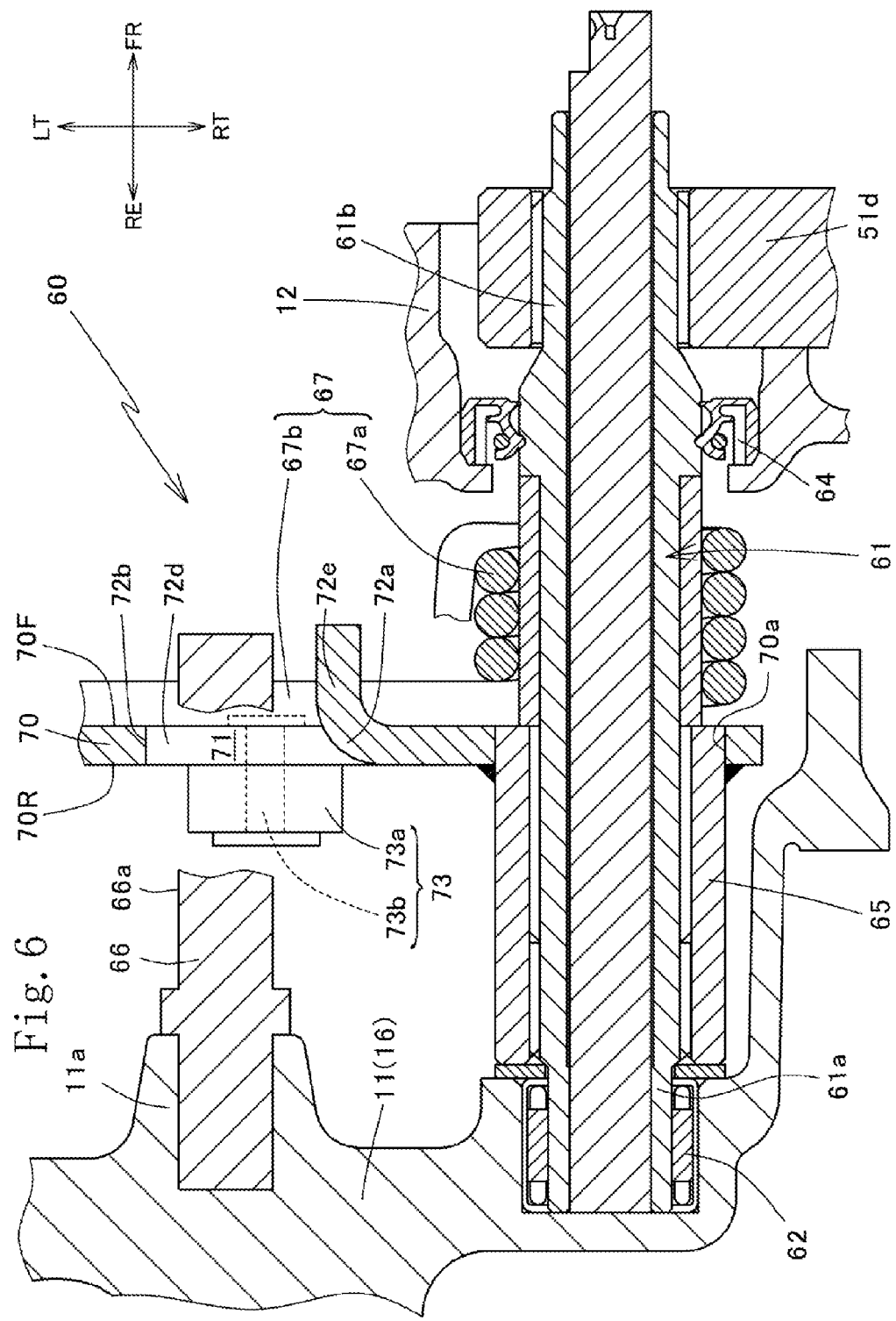
FIG. 6 is a sectional view, taken along the line VI-VI in FIG. 3.
Figure 7:
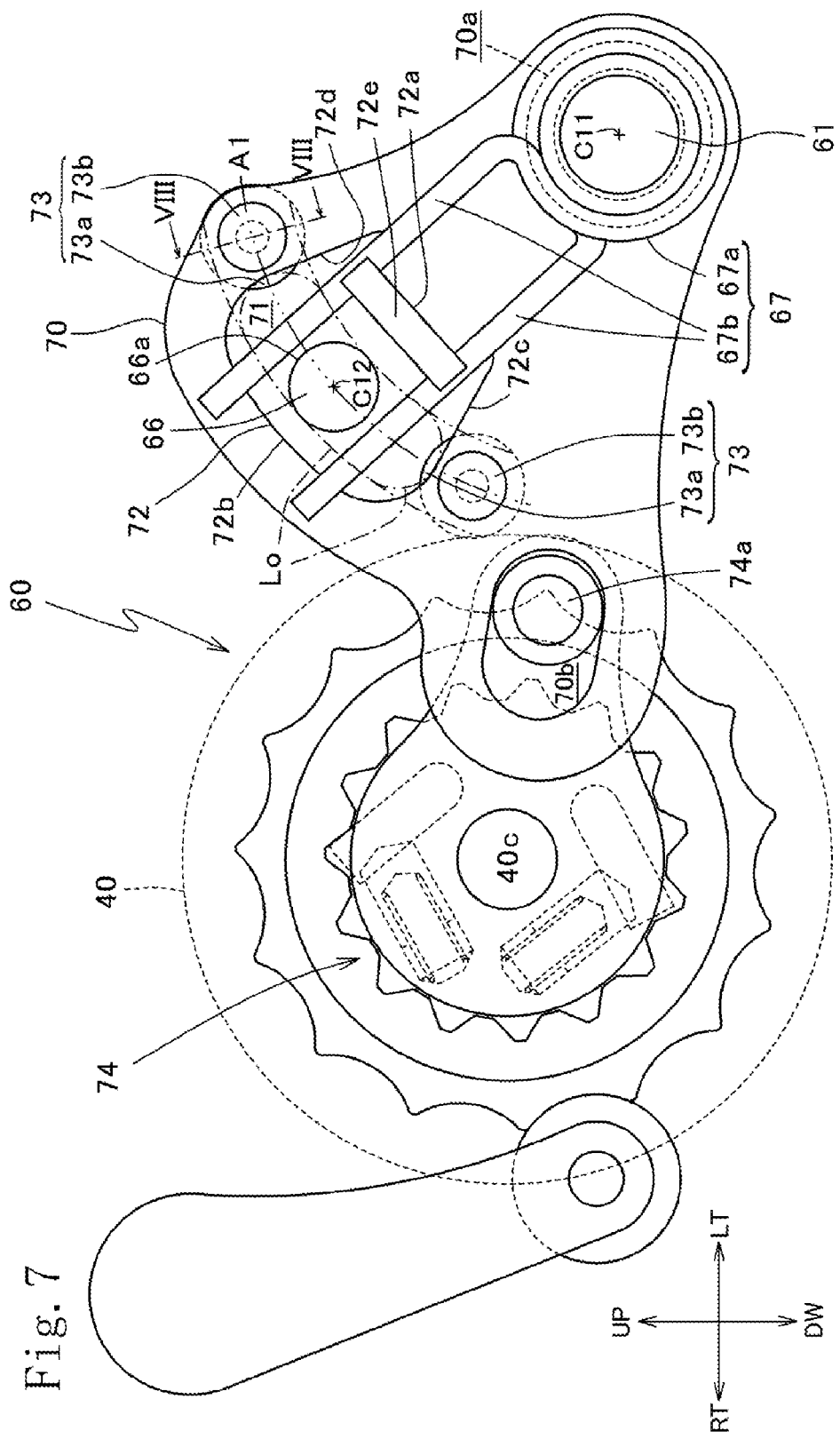
FIG. 7 is an enlarged view showing apart of a gear change mechanism in simplified form.

FIG. 6 is a section taken on the line VI-VI of FIG. 3, and FIG. 7 is an enlarged fragmentary view of the gear change mechanism 60 with some portions thereof shown simplified.

As shown in FIG. 7, the master arm 70 is basically in the form of a triangular plate. The master arm 70 has a proximal first angular edge portion in which a circular hole 70a is formed, while the master arm 70 has a second angular edge portion in which a drive opening 70b of elongated shape with rounded end edges is formed. The master arm 70 has a third angular edge portion in which a regulation opening 71 of trapezoidal shape is formed. As shown in FIG. 6, the master arm 70 is disposed at an intermediate position of the length of the shift spindle 61. As FIG. 7 shows, the master arm 70 is arranged, as viewed from the front side, with the first angular edge portion thereof positioned at the left side, with the second angular edge portion thereof positioned at the right side, and with the third angular edge portion thereof directed upward, in such a manner that the master arm 70 connects the shift spindle 61 to the pole ratchet mechanism 74 positioned on the right side of the shift spindle 61.

As shown in FIGS. 6 and 7, an extended collar 65 is fixedly fitted in the circular hole 70a of the master arm 70. The shift spindle 61 is fixedly fitted in the collar 65 in such a manner that the shift spindle 61 and the master arm 70 are rotatable integrally with the collar 65. The pole ratchet mechanism 74 has a follower projection 74a, which extends in, and is slidingly engageable with the drive opening 70b of the master arm 70.

As mentioned before, the regulation opening 71 of the master arm 70 has approximately a trapezoidal shape.

As FIG. 7 shows, the regulation opening 71 has a defining edge 72 including a short topside edge 72a, a long bottom side edge 72b and a pair of opposite regulation side edges 72c and 72d connecting the top and bottom side edges. The short top side edge 72a is nearest to the circular hole 70a.

As shown in FIGS. 6 and 7, the short top side edge 72a of the regulation opening 71 is bent to the side of a front surface 70F of the master arm 70 to form an engagement portion 72e with which a return spring 67 to be described later is engageable.

In the regulation opening 71 of the master arm 70 is inserted the stopper pin 66 for limiting the amount of rotary movement of the master arm 70, the stopper pin 66 extending in the front-to-rear direction in parallel to the shift spindle 61.

The stopper pin 66 has the shape of a circular cylindrical pole smaller in diametrical size than the internal size of the regulation opening 71. The stopper pin 66 is press-fitted in a fitting boss 11a formed on the front surface of the transmission holder 11. When viewed in the axial direction of the shift spindle 61, the stopper pin 66 is disposed to be located at an intermediate position between the oppositely arranged regulation side edges 72c and 72d of the regulation opening 71 of the master arm 70. As a consequence of such arrangement of the stopper pin 66 in the regulation opening 71, when the master arm 70 makes rotary movement by the rotation of the shift spindle 61, the stopper pin 66 is moved relative to the master arm 70 in a circular path within the regulation opening 71, so that the outer surface 66a of the stopper pin 66 is caused to contact one of the regulation side edges 72c and 72d of the regulation opening 71, whereby the amount of the rotary movement of the master arm 70 is regulated or limited.

Figure 8:
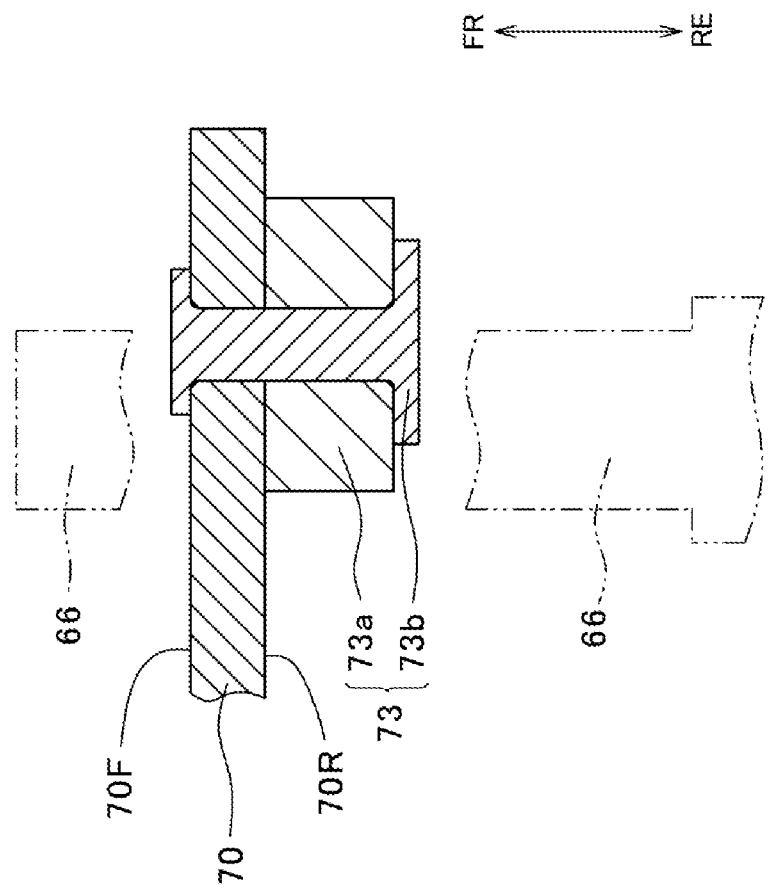
FIG. 8 is a sectional view, taken along the line VIII-VIII in FIG. 7.

As shown FIGS. 7 and 8, a pair of shock absorbing devices 73 are provided on one of the surfaces of the master arm 70, that is, on the rear surface 70R of the master arm 70, in the outer regions of the regulation side edges 72c and 72d of the regulation opening 71 so as to be on opposite sides of the stopper pin 66.

The shock absorbing devices 73 serves to absorb the shocks that occur when the regulation side edges 72c and 72d of the regulation opening 71 are abutted against the outer surface 66a of the stopper pin 66, to thereby suppress noises that occur as a result of the abutting engagement. Each of the shock absorbing device 73 is made up of a damper body 73a and a fixing pin 73b passed through the damper body 73a and the master arm 70.

FIG. 8 shows one of the shock absorbing devices 73 provided on the master arm 70 and is a section taken along the line VIII-VIII of FIG. 7.

As indicated in FIGS. 7 and 8, the damper body 73a is made of an elastic material such as rubber and formed in ring shape. The fixing pin 73b is a metal rivet and has a shape of T in sectional shape. The fixing pin 73b is passed through the master arm 70 from the side of the rear surface 70R of the same to the opposite side, that is, the front surface 70F of the same in the direction parallel to the stopper pin 66. The portion of the fixing pin 73b, projecting from the front surface 70F of the master arm 70, is then deformed with the use of a tool, etc. whereby the shock absorbing device 73 is affixed to the rear surface 70R of the master arm 70 by means of the fixing pin 73b.

The fixing pin 73b is not limited to a rivet and may be a bolt or screwed pin that can fasten the damper body 73a to the master arm 70.

As shown in FIG. 7, the fixing pins 73b forming the shock absorbing devices 73 are arranged on the outer sides of both the regulation side edges 72c and 72d of the regulation opening 71 and on a circular arc A1 having a circle center on the center axis C11 of the shift spindle 61 and passing through the center axis C12 of the stopper pin 66.

Figure 9:
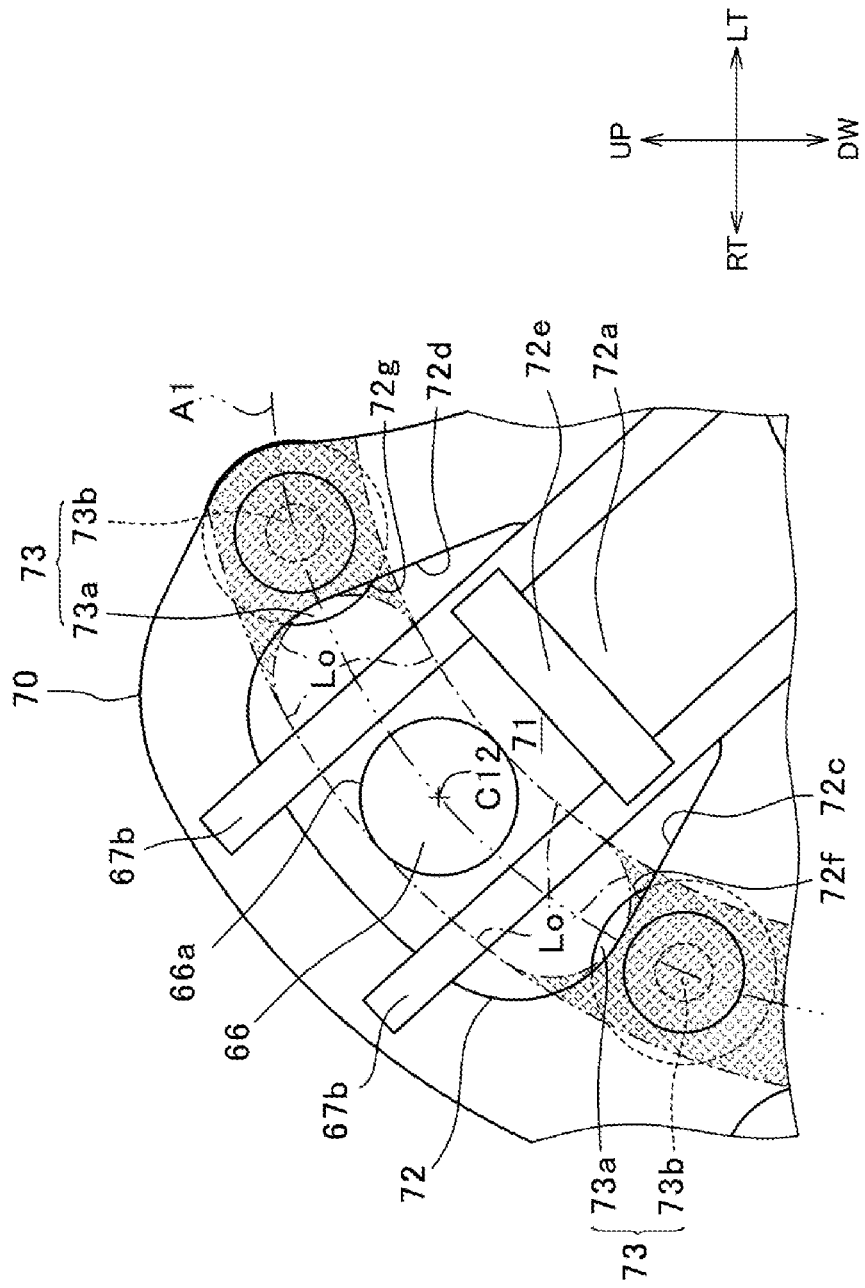
FIG. 9 is an enlarged view of a part of FIG. 7, including a stopper pin.

FIG. 9 is an enlarged view FIG. 7 showing the area around the stopper pin 66.

As shown in FIG. 9, the damper bodies 73a of the shock absorbing devices 73 are arranged to protrude partially from partial edge portions 72f and 72g of the regulation side edges 72c and 72d into the regulation opening 71, respectively, as viewed in the axial direction of the stopper pin 66. The partial edge portions 72f and 72g are portions of the regulation side edges 72c and 72d, located between extensions of a locus or path Lo (shown by one-dot chain line in FIG. 9) of the movement of the contour of the stopper pin 66 in the regulation opening 71 relative to the master arm 70, outwardly extended parts of the area defined by the path Lo being indicted by the broken line mesh. When the rotary movement of the master arm 70 is regulated by the stopper pin 66 as a result of the protrusion of the parts of the damper bodies 73a into the regulation opening 71, the stopper pin 66 is caused to be brought into contact or abutment initially with the damper bodies 73a.

Referring also to FIG. 7, a part of each of the damper bodies 73a desirably protrudes in the area of the path Lo of the contour of the stopper pin 66 and on a circular arc A1 having a circle center at the center axis C11 of the shift spindle 61 and passing through the center axis C12 of the stopper pin 66. In this case, when the rotary movement of the master arm 70 is to be regulated to be described later, each of the damper bodies 73a is caused to abut against the stopper pin 66 into the center axis C12 thereof, so that the damper body 73a can be effectively deformed.

As shown in FIGS. 6 and 7, there is provided a return spring 67 on the front surface 70F of the master arm 70. The return spring 67 urges the master arm 70 to return to its original position prior to the rotary movement. The return spring 67 is made up of a coil portion 67a and two end arm portions 67b extending from the coil portion 67a.

Through the coil portion 67a of the return spring 67 extends the shift spindle 61 with a diameter smaller than the inner diameter of the coil portion 67a. The two end arm portions 67b of the return spring 67 extend along the front surface 70F of the master arm 70 across the regulation opening 71 to the neighborhood of the radially outer edge of the master arm 70. The two end arm portions 67b extend on the two sides of the stopper pin 66 and of the engagement portion 72e of the master arm 70. Intermediate parts of the two end arm portions 67b are in engagement with the engagement portion 72e.

As shown in FIGS. 5 and 7, the pole ratchet mechanism 74 has the follower projection 74a thereof in sliding engagement with the elongated drive opening 70b. The pole ratchet mechanism 74 is provided on an intermediate portion of the shift drum shaft 40b, which extends to the front of the transmission holder 11. By rotary movement of the master arm 70 in one direction, the pole ratchet mechanism 74 is intermittently rotated because of the sliding engagement of the follower projection 74a within the elongated drive opening 70b, whereby the shift drum 40 rotatable with the pole ratchet mechanism 74 is rotated intermittently.

Figure 10:
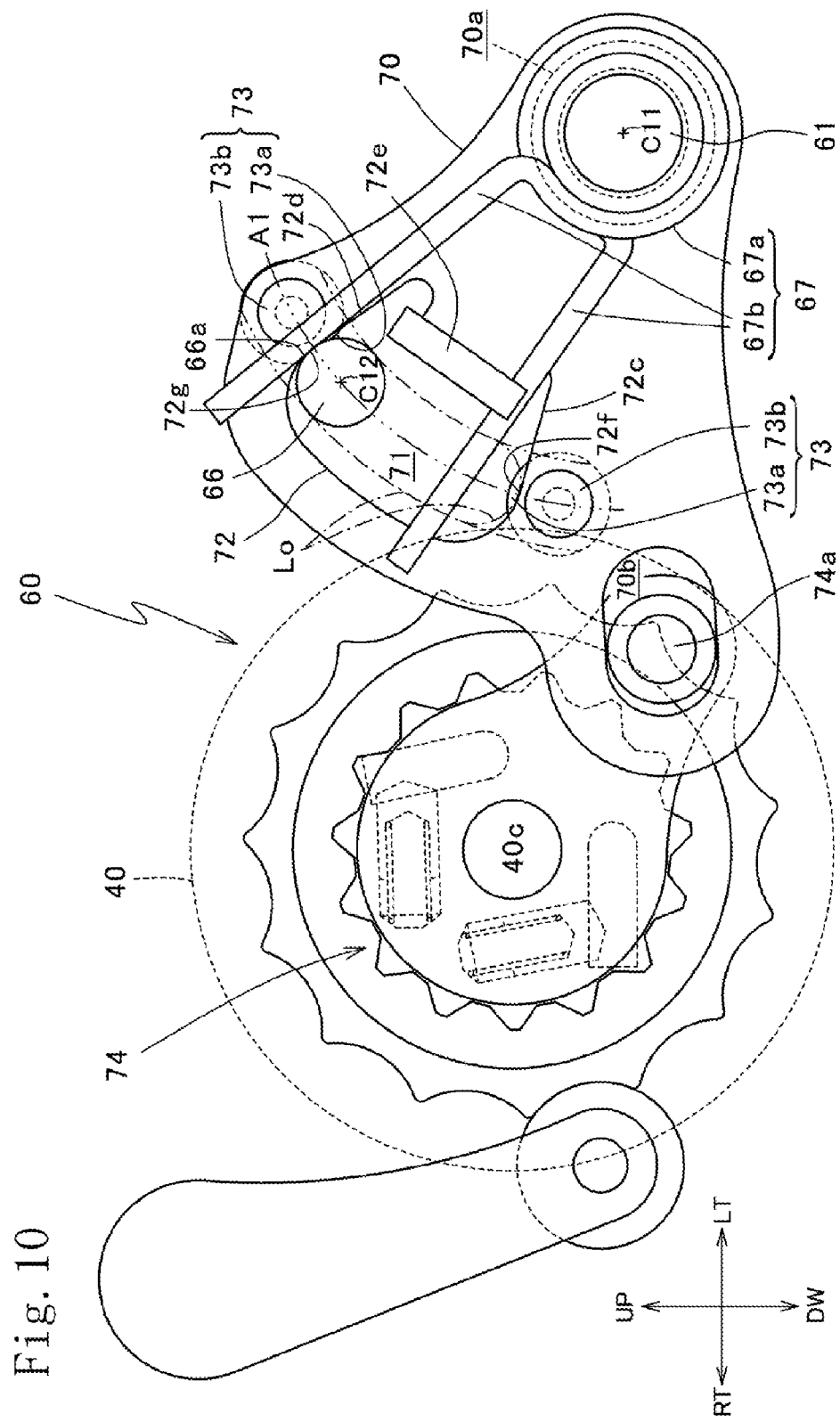
FIG. 10 is an enlarged view showing a state in which a master arm has made a rotary movement in one direction (counter-clockwise direction) from the state shown in FIG. 7.

FIG. 10 shows on an enlarged scale a state in which the master arm 70 has rotated in a direction (counter-clockwise direction) from the state shown in FIG. 7. With reference to FIGS. 7 and 10, relationship of the stopper pin 66, the master arm 70 and the shock absorbing devices 73 will be described in relation to the regulation of the rotary movement of the master arm 70 by means of the stopper pin 66.

When the shift spindle 61, the engagement portion 72e of the master arm 70 and the stopper pin 66 are on the same radial line as indicated in FIG. 7, the master arm 70 is in a neutral position prior to its rotational movement.

When the shift spindle 61 is rotated by rotational power input from the shift motor 50 to thereby rotate the master arm 70 in one direction, for example, in the counter-clockwise direction as viewed, the stopper pin 66 is moved in the clockwise direction relative to the master arm 70 about the center axis C11 of the shift spindle 61 so that the outer-circumferential surfaces 66a of the stopper pin 66 is caused to abut the damper body 73a of the shock-absorbing mechanism 73. When the master arm 70 is rotated further, the damper body 73a is forced against the stopper pin 66, so that the damper body 73a is acted upon by the stopper pin 66 to be deformed into concave shape. Consequently, as indicated in FIG. 10, the outer-circumferential surfaces 66a of the stopper pin 66 is abutted with the partial edge portions 72g of the regulation opening 71 of the master arm 70 so that the rotary movement of the master arm 70 is stopped. The amount of the rotary movement of the master arm 70 is regulated by the stopper pin 66, and the shift drum 40 is intermittently rotated by means of the pole ratchet mechanism 74, whereby shift change of the transmission 21 is carried out.

The deformation of the damper body 73a is useful in reducing the rotational speed of the master arm 70 and in absorbing shocks that occur when the master arm 70 strikes against the stopper pin 66. Thus, the fitting boss 11a for the stopper pin 66 can have a sufficient strength for fixedly securing the stopper pin 66. Further, the thickness and the weight of the fitting boss 11a and the neighboring parts of the transmission housing 16 can be reduced, and sounds or noises are suppressed that are produced when the master arm and the stopper pin 66 abut with each other.

Since the shock-absorbing device 73 is provided on the rear surface 70R of the master arm 70, deformation of the damper body 73a occurs within a limited region in which there occur the initial abutment of the outer surface 66a of the stopper pin 66 with the damper body 73a and then the abutment of the outer surface 66a of the stopper pin 66 directly with the partial edge portion 72f or 72g of the regulation opening 71 of the master arm 70, as will be noted from FIG. 10. For this reason, it is possible to adjust or suppress the amount of deformation of the damper bodies 73a within a constant amount in such a manner as to reduce the amount of deformation of the damper bodies 73a and improve the durability of the same. The damper bodies 73a may be rotatably attached to the master arm 70 so that each of the damper bodies 73a can be adjusted in angular position about its center to enable use of its entire peripheral surface for the abutment.

The shock-absorbing device 73 is provided on the rear surface 70R of the master arm 70, and at the instant the master arm 70 is prevented from its rotary movement by the stopper pin 66, the shock-absorbing device 73 does not exist between the outer surface 66a of the stopper pin 66 and the partial edge portion 72f or 72g of the regulation opening 71 of the master arm 70. Therefore, the amount of angular movement of the master arm 70 can be limited within a constant value by the configuration of the regulation opening 71.

When the rotary movement of the master arm 70 is stopped by the stopper pin 66, one of the end arm portions 67b of the return spring 67 is maintained in engagement with the engagement portion 72e of the master arm 70, while the other end arm portions 67b is forced to move away from the one end arm portions 67b against the force of the return spring 67. Thus, the master arm 70 is caused to be under a force urging the master arm 70, by the return spring 67, to return to its initial position before its rotary movement. When the rotary power of the shift motor 50 is cut so that the rotary driving force that has acted upon the master arm 70 through the shift spindle 61 is removed, the mater arm 70 returns to its neutral position before the rotary movement, together with the shift spindle 61, by the force of the return spring 67.

As will be noted from FIG. 6, the return spring 67 is positioned on the front surface 70F of the master arm 70, which front surface 70F is on an axially opposite side of the rear surface 70R of the master arm 70 on which the shock absorbing device 73 is provided. For this reason, the shock absorbing device 73 and the return spring 67 are disposed in compact arrangement on the master arm 70, without interference between the shock absorbing device 73 and the return spring 67, with resultant effective operational performance of them.

The first embodiment of the invention described above brings about the advantageous effects below.

The regulation opening 71 of the master arm 70 is provided with the shock absorbing devices 73. As viewed in the axial direction of the stopper pin 66, a part of each of the damper bodies 73a is formed to protrude, onto the path Lo of the movement of the contour of the stopper pin 66 in the regulation opening 71 relative to the master arm 70, from the partial edge portion 72f or 72g included in the regulation side edge 72c or 72d of the regulation opening 71, which partial edge portion 72f or 72g is included in extension of the path Lo.

Because of the above configuration, the stopper pin 66 operates to deform the damper bodies 73a protruding into the regulation opening 71 whenever the stopper pin 66 regulates the rotary movement of the master arm 70. The deformation of the damper bodies 73a of the shock absorbing devices 73 serves to absorb shocks occurring when the rotary movement of the master arm 70 is regulated by the stopper pin 66, whereby the strength of the fitting boss 11a for the stopper pin 66 can be easily secured. Further, the thickness and weight of the fitting boss 11a and its neighboring part of the transmission housing 16 can be reduced to be of reduced weight, and abutting sounds produced by the abutment of the master arm 70 with the stopper pin 66 can be suppressed.

Parts which can be made to be of reduced weight due to securing the strength are not limited to the fitting boss 11a for the stopper pin 66, but include the master arm 70, the gear change mechanism 60 including the shift spindle 61, the variable-speed drive device 20 including the reduction gear mechanism 51, etc.

The shock absorbing devices 73 are provided on the rear surface 70R of the master arm 70 with respect to the axial direction of the shift spindle 61.

According to this configuration, one of the damper bodies 73a is first made to be abutted by the stopper pin 66, then the one damper body 73a is deformed, and thereafter the outer surface 66a of the stopper pin 66 is caused to abut directly with the partial edge portions 72f or 72g of the regulation opening 71. The deformation of the one of the damper bodies 73a serves to reduce the shock produced when the master arm 70 strikes the stopper pin 66, so that it is easy to secure the strength of the fitting boss 11a for the stopper pin 66. Furthermore, the thickness and weight of the fitting boss 11a and its neighboring part of the transmission housing 16 are prevented from increasing with resultant reduction of the weight, and abutting sounds between the master arm 70 and the stopper pin 66 are reduced.

Since the shock absorbing devices 73 are provided on the rear surface 70R of the mater arm 70, deformation of each damper body 73a during the speed change operation is limited within the period from initial contact of each damper body 73a with the outer surface 66a of the stopper pin 66 to abutment of the partial edge portions 72f or 72g of the regulation opening 71 of the master arm 70 with the outer surface 66a of the stopper pin 66. Therefore, the amount of deformation of each damper body 73a can be maintained to a predetermined level at a reduced value, whereby the durability of the damper body 73a can be increased.

The shock absorbing device 73 is made up of the damper body 73a, and the fixing pin 73b passed through the damper body 73a to secure the same to the master arm 70. Therefore, the shock absorbing device 73 has a simple construction and can be formed easily at any required position. Thus, it is possible to reduce the weight and installation cost that result from the arrangement of the shock absorbing devices 73 on the master arm 70.

The shock absorbing devices 73 are provided at the two locations on the opposite sides of the stopper pin 66 and outside the regulation side edges 72c and 72d of the regulation opening 71 of the master arm 70. Thus, the shock absorbing devices 73 are arranged at positions required for speed up-shifting and down-shifting directions, whereby a reasonable arrangement of the shock absorbing devices 73 on the master arm 70 is enabled with reduced weight and installation cost.

The shift spindle 61 is provided with the return spring 67 for returning the master arm 70 to the angular position prior to its rotary movement. The return spring 67 is arranged on the front surface 70F of the master arm 70, which is the surface opposite to the rear surface on which the shock absorbing devices 73 are provided. Therefore, the shock absorbing devices 73 and the return spring 67 can be arranged on the master arm 70 in a compact arrangement with their required functions maintained.

A second embodiment of the variable-speed drive device 20 of the power unit P according to the present invention will be described with reference to FIGS. 11 through 15.

Figure 11:
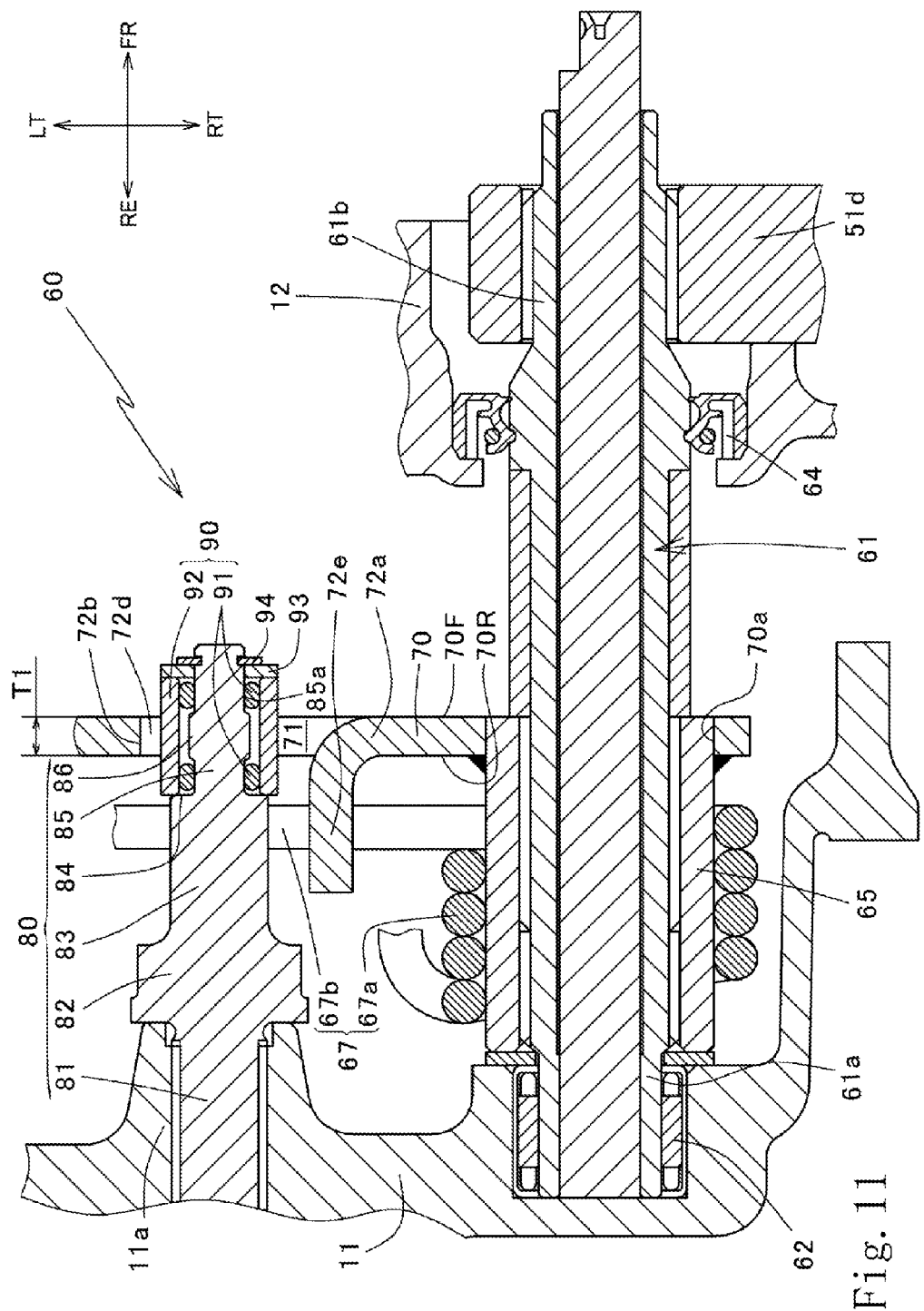
FIG. 11 is an enlarged sectional view showing a stopper pin and its neighboring elements in a second embodiment of the invention.
Figure 12:
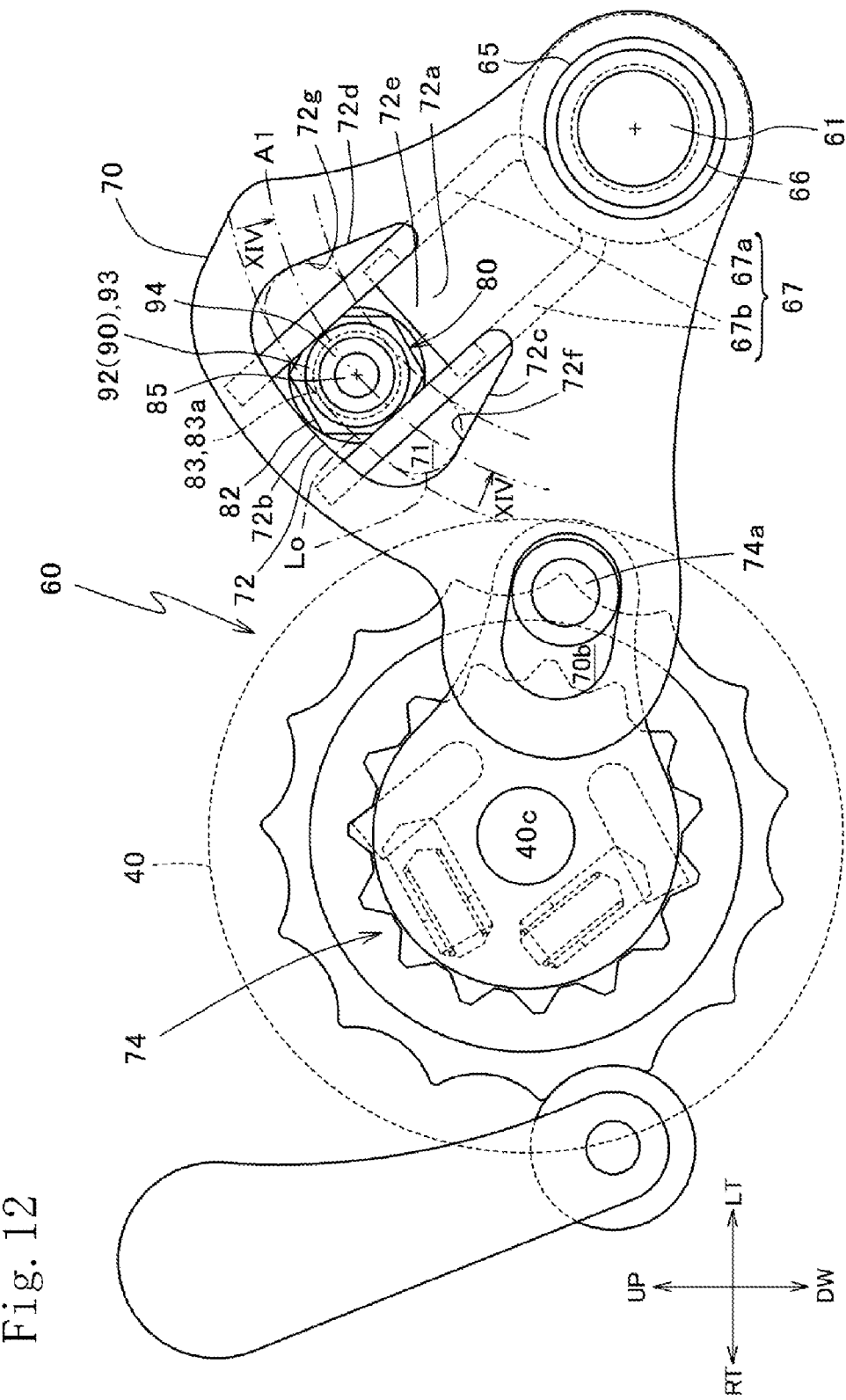
FIG. 12 is an enlarged view, partly in simplified form, of a gear change mechanism provided in the variable-speed drive device shown in FIG. 11.

FIG. 11 shows an enlarged partial section of a part including a stopper pin 80 in the second embodiment of the invention, and FIG. 12 is an enlarged partial view, partly in simplified form, showing a gear change mechanism 60 provided in the variable-speed drive device 20 shown in FIG. 11. In the following description of the second embodiment, the same reference letters as are used for the first embodiment will be used for the same or equivalent elements.

As shown in FIGS. 11 and 12, the stopper pin 80 extends through a regulation opening 71 of a master arm 70 in a front-to-rear direction in parallel with a shift spindle 61. As in the first embodiment, the stopper pin 80 is located, as viewed in the axial direction of the shift spindle 61, in an intermediate position between paired regulation side edges 72c and 72d of the regulation opening 71 of the master arm 70.

Figure 13:
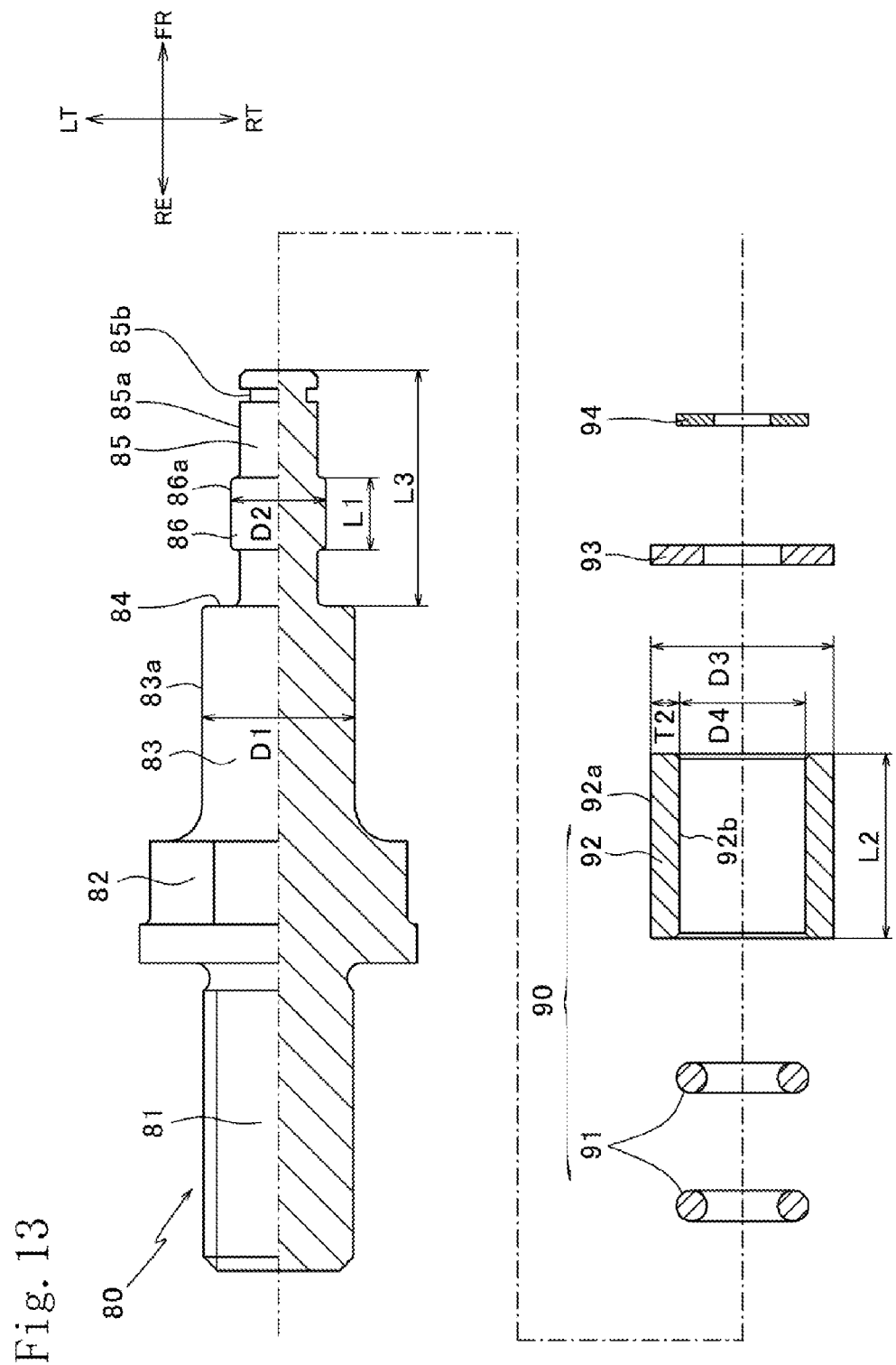
FIG. 13 is a disassembled view showing the stopper pin and a shock-absorbing device.

FIG. 13 is an exploded sectional view showing the stopper pin 80 and a shock absorbing device 90, the stopper pin 80 being shown in section in only one side of its center axis.

As shown in FIGS. 11 and 13, the stopper pin 80 includes, from its rear end to its front end, a male screw section 81, a tool engaging section 82, a straight rod section 83 and a reduced diameter section 85. The male screw section 81 forms a rear extreme part of the stopper pin 80 and is adapted for screw engagement with a fitting boss 11a formed at a front part of a transmission holder 11. Referring to FIG. 12, the tool engaging section 82 is formed in hexagonal shape as viewed in the axial direction of the stopper pin 80. The straight rod section 83 has a circular cylindrical shape with an outer diameter D1 smaller than the radial size of the regulation opening 71 of the master arm 70. The reduced diameter section 85 has a diameter smaller than the outer diameter D1 of the straight rod section 83. A narrow circumferential groove 85b is formed in the extreme front area of the reduced diameter section 85. A guide shoulder 84 is formed between the straight rod section 83 and the reduced diameter section 85, the guide shoulder 84 having a surface extending perpendicular to the axis of the stopper pin 80.

As indicated in FIG. 11, at an axially intermediate position, somewhat nearer to the straight rod section 83, of the reduced diameter section 85 of the stopper pin 80, an annular protrusion 86 is formed coaxially with the reduced diameter section 85 to radially outwardly protrude from the outer surface 85a of the reduced diameter section 85. With reference also to FIG. 13, the protrusion 86 has a length L1 in the axial direction of the stopper pin 80, which length L1 is approximately equal to the thickness T1 of the master arm 70. The axially intermediate position of the protrusion 86 and the axially intermediate position of the thickness of the master arm 70 are set to coincide with each other.

Referring to FIGS. 11 and 13, the reduced diameter section 85 of the stopper pin 80 has fitted therearound with the shock absorbing device 90. On the reduced diameter section 85 are fitted a guide washer 93 and a retaining ring 94 at axially opposite side of the guide shoulder 84 with respect to the shock absorbing device 90. The above arrangement of the shock absorbing device 90 around the reduced diameter section 85 enables compact formation of the shock absorbing device 90 around the stopper pin 80 while suppressing protrusion of the shock absorbing device 90 around the stopper pin 80.

The shock absorbing device 90 is composed of O-rings 91 made of an elastic material such as rubber, and a metal collar 92. The O-rings 91 are fitted respectively on two outer surfaces 85a at front and rear sides, that is, opposite sides with respect to the axial direction, of the protrusion 86 of the reduced diameter section 85. If the O-rings 91 are fitted on the outer surfaces at axially equal distances from the protrusion 86, movement of the collar 92 to be described later is facilitated.

As shown in FIG. 11, the collar 92 is formed in cylindrical shape and fitted on the reduced diameter section 85 of the stopper pin 80 with the O-rings 91 interposed therebetween, the collar 92 thus extending parallel to the stopper pin 80. The rear end of the collar 92 thus fitted is in contact with the guide shoulder 84 of the stopper pin 80.

The O-rings 91 are thus fitted between the inner peripheral surface 92b of the collar 92 and the outer peripheral surfaces 85a of the reduced diameter section 85 of the stopper pin 80.

As shown in FIGS. 11 and 13, the axial length L2 of the collar 92 of the shock absorbing device 90 is smaller than the axial length L3 of the reduced diameter section 85 of the stopper pin 80. The outer diameter D3 of the collar 92 is greater than the outer diameter D1 of the straight rod section 83 of the stopper pin 80, while the inner diameter D4 of the collar 92 is greater than the outer diameter D2 of the protrusion 86. The thickness T2 of the collar 92 is set to be equal to the radial distance from the outer surface 86a of the protrusion 86 to the outer surface 83a of the straight rod section 83, that is, to be equal to a half of the value (D1-D2).

The guide washer 93 is in the shape of a circular disc and is fitted on the reduced diameter section 85 of the stopper pin 80 by causing the center hole thereof to be fitted on the reduced diameter section 85 with one surface of the guide washer 93 in contact with the front end of the collar 92. The collar 92 is held around the stopper pin 80 between the guide washer 93 and the guide shoulder 84 of the stopper pin 80, so that the collar 92 is smoothly guided in making radial movement.

The retaining ring 94 is C-shaped and is fitted in the circumferential groove 85b formed in the front end of the reduced diameter section 85 to prevent the shock absorbing device 90 and the guide washer 93 from slipping axially off the stopper pin.

The shock absorbing device 90 is thus provided around the outer surface 85a of the reduced diameter section 85 of the stopper pin 80, and, as indicated in FIG. 12 as viewed in the axial direction of the shift spindle 61, a part of the shock absorbing device 90 (a part of the collar 92 in this embodiment) protrudes radially outward from the outer surface 83a of the straight rod section 83 of the stopper pin 80 in a manner as to extend to cover the path Lo of the rotary movement of the contour of the stopper pin 80 in the regulation opening 71 relative to the master arm 70.

In the second embodiment of the invention, the short top side edge 72a of the regulation opening 71 of the master arm 70, as shown in FIG. 11, is formed with an engagement portion 72e bent to the side of the rear surface 70R of the master arm 70, and a return spring 67 is engaged with the engagement portion 72e.

The return spring 67 is arranged in the rear side of the master arm 70 with respect to the axial direction of the shift spindle 61. The return spring 67 acts on the master arm 70 to urge the same to return to the original position prior to its rotary movement. The return spring 67 is made up from a coil portion 67a and two end arm portions 67b extending from the coil portion 67a, as in the case of the first embodiment of the invention.

The coil portion 67a of the return spring 67 is passed by, and secured to an elongated color 65. The two end arm portions 67b of the return spring 67 extend in parallel with the rear surface 70R of the master arm 70 over the area of the regulation opening 71, on the two sides of the straight rod section 83 of the stopper pin 80 and on the two sides of the engagement portion 72e of the master arm 70, so as to finally extend to the radially outer edge of the master arm 70.

Intermediate parts of the two end arm portions 67b are in abutting engagement with the engagement portion 72e of the master arm 70

Figure 14:
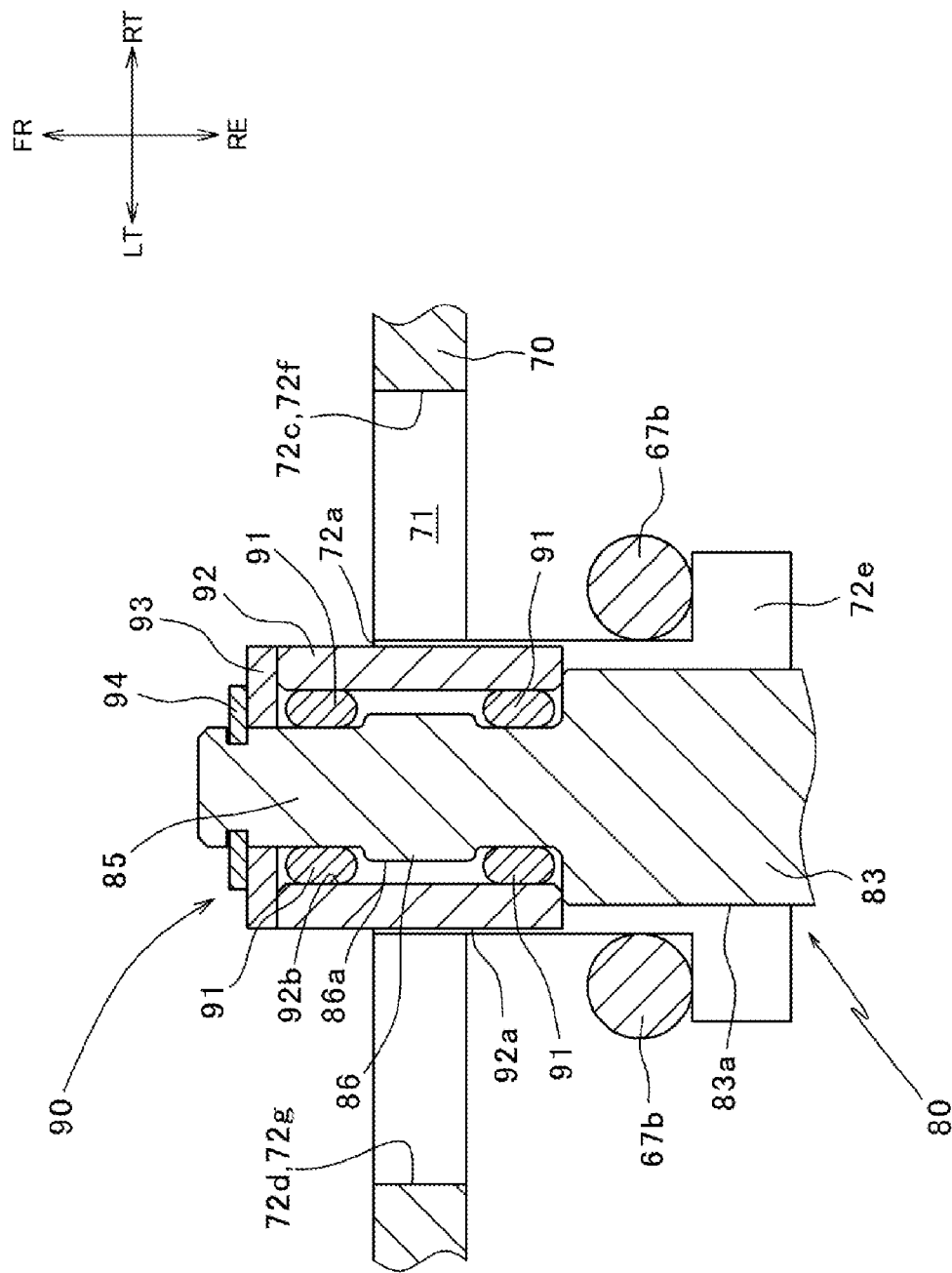
FIG. 14 is a sectional view taken along the line XIV-XIV in FIG. 12.
Figure 15:
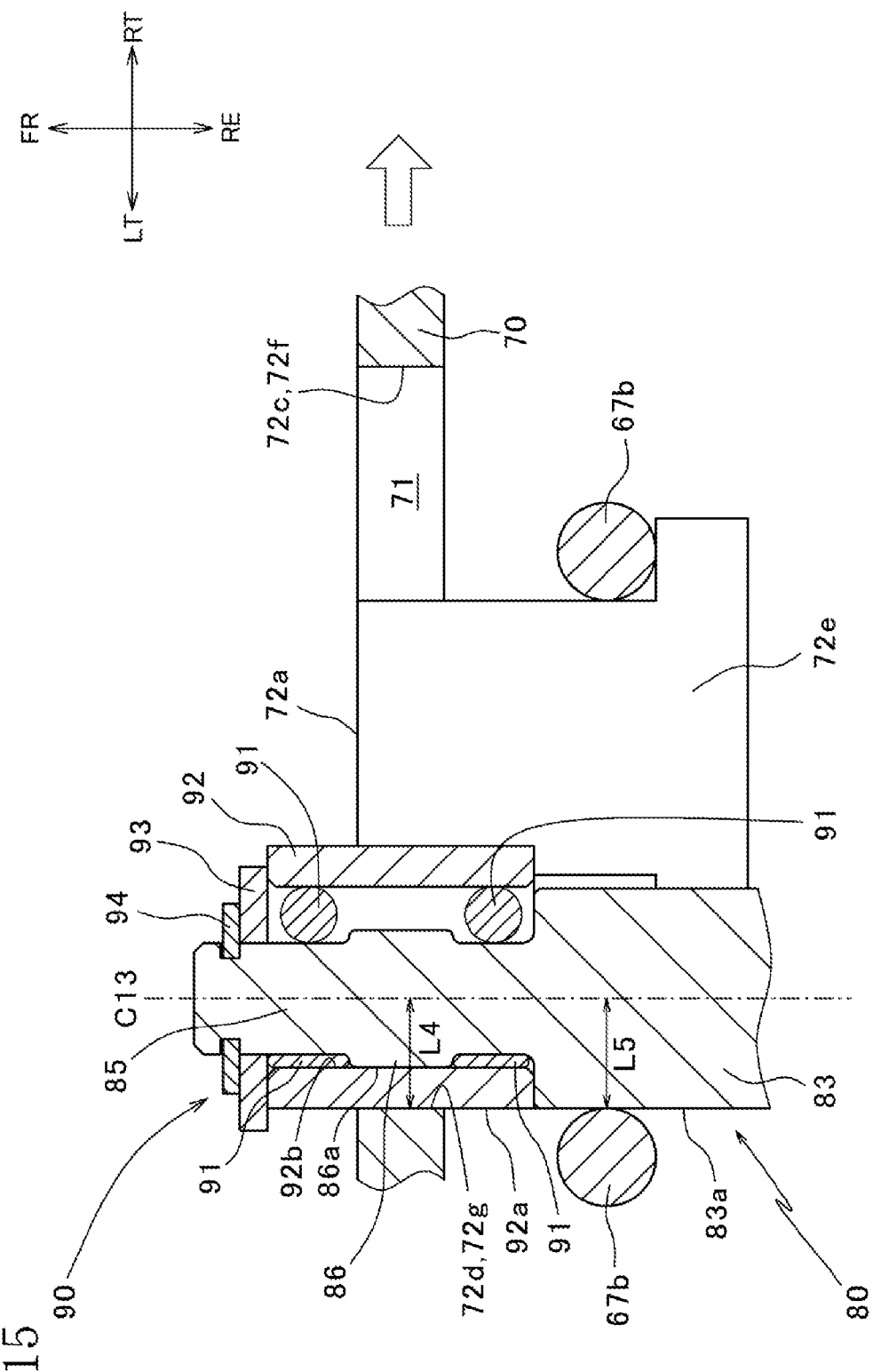
FIG. 15 is an enlarged view, partly in section, showing a state in which a master arm has made a rotary movement in one direction (counter-clockwise direction) from the state shown in FIG. 14.
Figure 16:
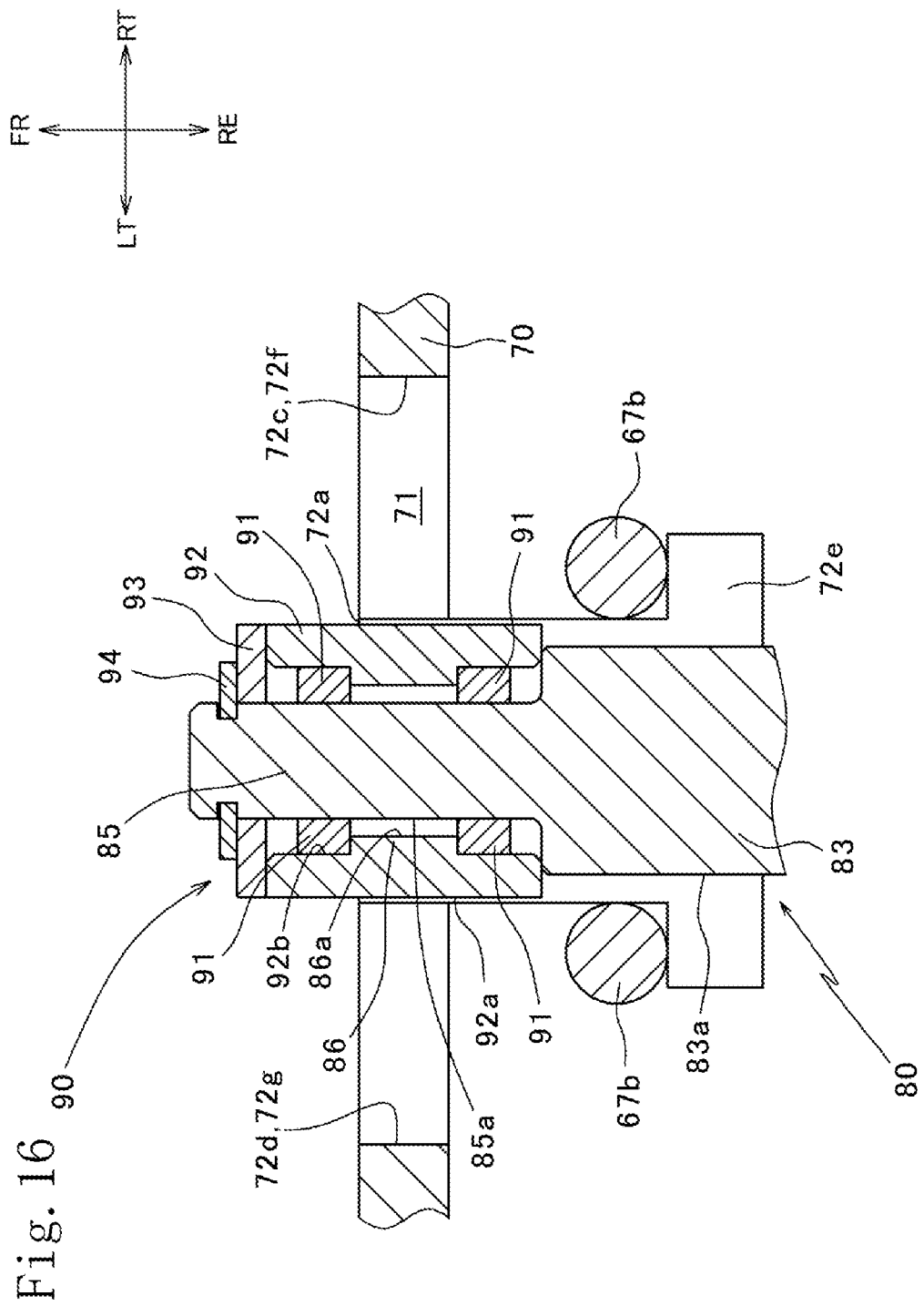
FIG. 16 shows a modified form of the second embodiment of the invention.

FIG. 14 is a section taken on the line XIV-XIV of FIG. 12, and FIG. 15 shows a fragmentary section showing a state in which the master arm 70 has made rotary movement in one direction (counter-clockwise direction).

As FIG. 14 shows, before the rotary movement of the master arm 70, the collar 92 of the shock absorbing device 90 is positioned around the annular protrusion 86 of the reduced diameter section 85 of the stopper pin 80, with an annular space of uniform radial thickness maintained between the annular protrusion 86 and the inner surface of the collar 92, under the resilient forces of the O-rings 91. When the shift spindle 61 is rotated by the power of the shift motor 50 and the master arm 70 thereby makes rotary movement in one of the rotating directions (for example, in the counter-clockwise direction), the stopper pin 80 makes rotary movement in the clockwise direction relative to the master arm 70, so that the outer surface 92a of the collar 92 of the shock absorbing device 90 is caused to abut with the partial edge portion 72g of the regulation opening 71 of the master arm 70. As the master arm 70 makes further rotary movement, the master arm 70 acts on the collar 92 and moves the same in the direction in which the master arm 70 moves, while acting on and deforming or compressing portions of the O-rings 91 adjoining the partial edge portion 72g. The deformation or compression of the O-rings 91 serves to retard the rotary movement of the master arm 70, thereby absorbing shocks occurring when the master arm 70 contacts the stopper pin 80, with resultant suppression of the abutting noise that occurs between the master arm 70 and the stopper pin 80.

As shown in FIG. 15, when the master arm 70 acts on the collar 92, the inner surface 92b of the collar 92 of the shock absorbing device 90 is brought into abutment with the outer surface 86a of the protrusion 86 of the reduced diameter section 85 of the stopper pin 80, so that the amount of the rotary movement of the master arm 70 is regulated or limited by the stopper pin 80, and the shift drum 40 is therefore intermittently rotated by rotary movement of the pole ratchet mechanism 74. Thus, the shift change of the transmission 21 is carried out. When the rotary movement of the master arm 70 is regulated by the stopper pin 80 through the shock absorbing device 90 as described above, no changeable clearance exists between the partial edge portion 72f or 72g of the regulation opening 71 and the outer surface 86a of the protrusion 86 of the stopper pin 80. This enables regulation of the amount of the rotary movement of the master arm 70 to an exact amount due to the shape of the regulation opening 71.

In the above state, the distance L4 from the center axis C13 of the stopper pin 80 to the abutting area between the outer surface 92a of the collar 92 and the partial edge portion 72g of the regulation opening 71 of the master arm 70 is equal to the distance L5 from the center axis C13 of the stopper pin 80 to the abutting area between the outer surface 83a of the straight rod section 83 of the stopper pin 80 and one of the end arm portions 67b of the return spring 67. For this reason, the return spring 67 to be used may be of the same resilient force as in the first embodiment of the invention. Further, it is not required to enlarge the size of the regulation opening 71 of the master arm 70, even in case the ratio of the total cross-sectional area of the stopper pin 80 and the shock absorbing device 90, as viewed in the axial direction of the stopper pin 80, is increased relative to the area of the regulation opening 71.

The second embodiment of the invention as described above brings about the advantageous effects below.

The stopper pin 80 is provided with the shock absorbing device 90, and the shock absorbing device 90 is arranged to partly extend into the area of the path Lo of the contour of the stopper pin 80 within the regulation opening 71 of the master arm 70.

According to this arrangement, when the master arm 70 is moved to make rotary movement and its rotary movement is regulated by the stopper pin 80, the stopper pin 80 actively operates to deform parts of the O-rings 91 of the shock absorbing device 90 extending into the area of the path Lo of the stopper pin 80. The deformation of the O-rings 91 serves to absorb the shocks produced when the stopper pin 80 regulates the rotary movement of the master arm 70, thus making it easy to secure the strength of the fitting boss 11a for the stopper pin 80. Additionally, the thickness and weight of the fitting boss 11a for the stopper pin 80 and its neighboring part of the transmission housing 16 are suppressed and made to be of light weight, and contact sounds between the master arm 70 and the stopper pin 80 are reduced.

The arrangement of the O-rings 91 by merely fitting them on the outer surface of 85a of the reduced diameter section 85 of the stopper pin 80 provides a simple construction including the O-rings 91 on the stopper pin 80.

The shock absorbing device 90 is provided with the cylindrical collar 92 fitted around the stopper pin 80 through the O-rings 91, and the outer surface 85a of the reduced diameter section 85 of the stopper pin 80 is formed with the protrusion 86 protruding radially outward from the outer surface 85a. When the rotary movement of the master arm 70 is regulated by the stopper pin 80, the outer surface 92a of the collar 92 first contacts one of the partial edge portions 72f and 72g of the master arm 70, and thereafter the O-rings 91 are deformed such that the collar 92 contacts the protrusion 86 of the stopper pin 80. Because of such deformation of the O-rings 91, shocks produced when the stopper pin 80 regulates the rotary movement of the master arm 70 are absorbed, and the strength of the fitting boss 11a for the stopper pin 80 can be readily retained. Further, the thickness and weight of the fitting boss 11a and its neighboring part of the transmission housing 16 are reduced to be of light weight, and contact sounds of the master arm 70 with the stopper pin 80 are also reduced. When the collar 92 and the stopper pin 80 are brought into abutment with each other in the area of the protrusion 86, the deformation of the O-rings 91 is stopped. Therefore, the amount of deformation of the O-rings 91 made by the collar 92 can be controlled to a predetermined value, whereby durability of the O-rings 91 can be retained.

The protrusion 86 is formed at such an axial position of the stopper pin 80 that coincides with the defining edge 72 of the regulation opening 71 of the master arm 70. The O-rings 91 are provided to form a pair on the opposite sides of the protrusion 86. Therefore, when the rotary movement of the master arm 70 is to be regulated by the stopper pin 80, the collar 92 is shifted to concurrently deform the pair of the O-rings 91, after being contacted by the master arm 70, while being moved in arcuate path, so that the operation of the shock absorbing device 90 is smooth.

The stopper pin 80 includes the straight rod section 83, and the reduced diameter section 85 smaller in diameter than the straight rod section 83, the guide shoulder 84 being formed between the straight rod section 83 and the reduced diameter section 85. The shock absorbing device 90 is provided around the reduced diameter section 85, and the guide washer 93 and the retaining ring 94 are provided at axially opposite side of the guide shoulder 84 with respect to the shock absorbing device 90 on the reduced diameter section 85. Therefore, when the rotary movement of the master arm 70 is regulated by the stopper pin 80, the collar 92 is guided by the guide shoulder 84 and the guide washer 93, while moving along the path of the rotary movement of the master arm 70 and maintaining its attitude parallel to the stopper pin 80. Thus, smooth operation of the shock absorbing device 90 is ensured.

The embodiments of the invention have been described above with reference to the drawings. The invention is not limited to the above embodiments but can be practiced in ways not departing from the scope of the invention.

In the first embodiment of the invention, the damper body 73a is not limited to the cylindrical shape but may be of a rectangular cross section or of a fan-shaped cross section, provided that part of the damper body extends in the path Lo of the stopper pin 66.

In the first embodiment of the invention, the shock absorbing devices 73 may be provided on the stopper pin 66. In the second embodiment of the invention, the shock absorbing devices 90 may be provided on the master arm 70.

In the second embodiment of the invention, the annular protrusion 86 may be formed not only on the reduced diameter section 85 of the stopper pin 80, but on the inner surface 92b of the collar 92, in such a manner that the protrusion 86 and the outer surface 85a of the reduced diameter section 85 are brought into abutment when the rotational movement of the master arm 70 is regulated by the stopper pin 80. In this case, the O-rings 91 as resilient members may be secured to the inner surface 92b of the collar 92 to be integral with the collar 92. By so doing, the shock absorbing devices 90 are made simple members which are easy to securely attach to the stopper pin 80.

In the second embodiment of the invention, for regulating the rotary movement of the master arm 70, it is only required that the O-rings 91 are deformed to enable the inner surface 92b of the collar 92 to contact the outer surface 86a of the protrusion 86. Therefore, the thickness T2 of the collar 92 is not required to be limited to that of the second embodiment.

Further, in the second embodiment of the invention, it is only required that the collar 92 and the protrusion 86 of the stopper pin 80 are brought into contact with each other. Therefore, the protrusion 86 may be provided on each of the inner surface 92b of the collar 92 and the outer surface 85a of the reduced diameter section 85 of the stopper pin 80 in such a manner that the two protrusions 86 are opposed in position.

The shift spindle 61 is not limited to the type operated electrically by the shift motor 50 but may be of a type operated by a foot pedal.

REFERENCE LETTERS

P . . . Power unit, Lo . . . Path, 20 . . . Variable-speed drive device, 21 . . . Transmission, 40 . . . Shift drum, 61 . . . Shift spindle, 66 . . . Stopper pin, 66a . . . Outer surface, 67 . . . Return spring, 70 . . . Master arm, 70F . . . Front surface, 70R . . . Rear surface, 71 . . . Regulation opening, 72 . . . Defining edge 72, 73 . . . Shock absorbing device, 73a . . . Damper body 73a, 73b . . . Fixing pin 73b, 80 . . . Stopper pin, 83 . . . Straight rod section, 84 . . . Guide shoulder, 85a . . . Outer surface, 86 . . . Protrusion, 90 . . . Shock absorbing device, 91 . . . O-ring, 92 . . . Collar, 92b . . . Inner surface, 93 . . . Guide washer, 94 . . . Retaining ring.

The invention claimed is:

1. A variable-speed drive device for a power unit, used for a transmission wherein speed changes are performed by intermittent rotation of a shift drum, comprising:
a shift spindle for operating the transmission for speed changes;
a master arm fixedly mounted on the shift spindle for rotary movement with the shift spindle and having an opening; and
a stopper pin extending through the opening of the master arm to regulate the amount of the rotary movement of the master arm; wherein:
the master arm is provided thereon with shock absorbing devices;
at least a part of each of the shock absorbing devices protrudes into a path of rotary movement of the stopper pin in the opening of the master arm, from each of edge portions included in a defining edge of the opening of the master arm, when viewed in the axial direction of the stopper pin, said edge portions lying on extensions of the path of the rotary movement of the stopper pin;
the master arm is so formed in a plate shape that abutment of the edge portions of the opening of the master arm with the outer surface of the stopper pin regulates the rotary movement; and
each of the shock absorbing devices is provided on one (70R) of the surfaces of the master arm with respect to the axial direction of the stopper pin; and
each of the shock absorbing devices comprises a damper body of an elastic material, and a fixing pin fixedly attaching the damper body to the master arm.

2. The variable-speed drive device for a power unit according to claim 1, wherein the shock absorbing devices are provided at two locations on opposite sides of the stopper pin and at locations in the edge portions of the opening of the master arm.

3. The variable-speed drive device for a power unit according to claim 1, wherein the shift spindle is associated with a return spring for urging the master arm to return to a position prior to the rotary movement; and
the return spring is provided on a surface of the master arm opposite the one surface of the master arm on which the shock absorbing devices are provided, with respect to the axial direction of the stopper pin.

4. A variable-speed drive device for a power unit, used for a transmission wherein speed changes are performed by intermittent rotation of a shift drum, comprising:
a shift spindle for operating the transmission for speed changes;
a master arm fixedly mounted on the shift spindle for rotary movement with the shift spindle and having an opening; and
a stopper pin extending through the opening of the master arm to regulate the amount of the rotary movement of the master arm; wherein:
the stopper pin is provided with a shock absorbing device;
at least a part of the shock absorbing device protrudes into a path of rotary movement of the stopper pin within a defining edge of the opening of the master arm, from an outer surface of the stopper pin, when viewed in the axial direction of the stopper pin;
the shock absorbing device is provided on the outer surface of the stopper pin;
the shock absorbing device includes an elastic member disposed on the outer surface of the stopper pin; and
the rotary movement of the master arm is regulated by the stopper pin through the shock absorbing device.

5. The variable-speed drive device for a power unit according to claim 4, wherein the shock absorbing device includes a cylindrical collar fitted on the stopper pin;
   the elastic member is disposed between an inner surface of the cylindrical collar and the outer surface of the stopper pin; and
   a protrusion is formed on one of the inner surface of the cylindrical collar and the opposite outer surface of the stopper pin.

6. The variable-speed drive device for a power unit according to claim 5, wherein the protrusion is formed in a position coinciding with the defining edge of the opening of the master arm, with respect to the axial direction of the stopper pin; and
   the elastic member and a further elastic member are arranged in a pair on opposite sides of the protrusion with respect to the axial direction of the stopper pin.

7. The variable-speed drive device for a power unit according to claim 6, wherein the stopper pin includes a rod section and a reduced diameter section smaller in diameter than the rod section;
   a guide shoulder is formed between the rod section and the reduced diameter section to guide radial movement of the collar;
   the shock absorbing device is fitted on the reduced diameter section; and
   the reduced diameter section is fitted therearound with a guide washer and a retaining ring at axially opposite side of the guide shoulder with respect to the shock absorbing device, the guide washer functioning to guide radial movement of the collar and the retaining ring functioning to prevent axial displacement of the guide washer and the collar.

8. The variable-speed drive device for a power unit according to claim 2, wherein the shift spindle is associated with a return spring for urging the master arm to return to a position prior to the rotary movement; and
   the return spring is provided on a surface of the master arm opposite the one surface of the master arm on which the shock absorbing devices are provided, with respect to the axial direction of the stopper pin.

* * * * *